United States Patent
Batchu et al.

(10) Patent No.: US 9,713,038 B2
(45) Date of Patent: Jul. 18, 2017

(54) MOBILE TERMINATED CALL PERFORMANCE DURING SINGLE RADIO LONG TERM EVOLUTION (LTE) MODE

(71) Applicant: QUALCOMM Incorporated, San Diego, CA (US)

(72) Inventors: Bhaskara Viswanadham Batchu, Hyderabad (IN); Sharad Shahi, Boulder, CO (US); Reza Shahidi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/943,372

(22) Filed: Nov. 17, 2015

(65) Prior Publication Data
US 2017/0142617 A1    May 18, 2017

(51) Int. Cl.
*H04W 36/30* (2009.01)
*H04W 36/00* (2009.01)
*H04W 68/02* (2009.01)

(52) U.S. Cl.
CPC ....... *H04W 36/0005* (2013.01); *H04W 68/02* (2013.01)

(58) Field of Classification Search
CPC .................................................... H04W 36/00
USPC ................................................ 455/436–437
See application file for complete search history.

(56) References Cited

U.S. PATENT DOCUMENTS

| | | | |
|---|---|---|---|
| 8,208,920 B2 | 6/2012 | Sampath et al. | |
| 8,644,285 B2 | 2/2014 | Cai et al. | |
| 8,825,860 B2 | 9/2014 | Linsky et al. | |
| 2010/0317347 A1 | 12/2010 | Burbidge et al. | |
| 2011/0207500 A1* | 8/2011 | Nakamura | H04W 52/325 455/522 |
| 2014/0003397 A1 | 1/2014 | Goyal et al. | |
| 2014/0113636 A1 | 4/2014 | Lee et al. | |
| 2014/0376516 A1* | 12/2014 | Goyal | H04W 72/0446 370/331 |
| 2015/0131619 A1 | 5/2015 | Zhu et al. | |

OTHER PUBLICATIONS

International Search Report and Written Opinion—PCT/US2016/058761—ISA/EPO—Feb. 2, 2017.

* cited by examiner

*Primary Examiner* — Michael T Vu
(74) *Attorney, Agent, or Firm* — Changwoo Yang

(57) ABSTRACT

Various embodiments include methods and apparatuses for responding to a page message for a mobile-terminated call by a wireless communication device using a single radio Long-term Evolution (LTE) mode. A wireless communication device may receive the page message for the mobile-terminated call, release resources of the wireless communication device owned by a non-LTE voice radio access technology receiving the page message, and execute an extended service request by an LTE radio access technology. The wireless communication device may search for a network for responding to the page message after the extended service request is completed. The network may be from a set of networks including a serving pilot network, a preapproved pilot network, and an unapproved pilot network, and each of the pilot networks may belong to a first base station. The wireless communication device may send a page message response using the network in response to finding the network.

25 Claims, 11 Drawing Sheets

MOBILE TERMINATED CALL PERFORMANCE DURING SINGLE RADIO LONG TERM EVOLUTION (LTE) MODE

BACKGROUND

In a multi-subscription multi-standby (MSMS) communication device operating in a single radio long-term evolution (SR-LTE) mode, both a voice technology (such as 1× or any other voice technology) and long-term evolution (LTE) protocol stacks can be simultaneously active, sharing one radio reception/transmission chain. If an MSMS device receives a mobile-terminated call using a voice radio access technology (RAT), the MSMS device releases all resources used by the voice radio access technology and triggers an extended service request (ESR) on an LTE network. After completing the extended service request, the MSMS device proceeds with the mobile-terminated call by reacquiring the resources used by the voice radio access technology. The MSMS device may then execute a handoff to a base station with the strongest pilot signal before sending a page response to a general page message. The handoff to a different base station can result in a dropped mobile-terminated call when the base station does not have the mobile terminated call context.

SUMMARY

The methods and apparatuses of various embodiments provide circuits and methods for responding to a page message for a mobile-terminated call by a wireless communication device using a single radio Long-Term Evolution (LTE) mode. Various methods may include receiving a page message for the mobile-terminated call, releasing resources of the wireless communication device owned by a non-LTE voice radio access technology receiving the page message, executing an extended service request by an LTE radio access technology, searching for a network for responding to the page message after the extended service request is completed, sending a page message response using the network in response to finding the network, and, in response to not finding a network, identifying a strongest neighbor pilot network, and sending a page message response using the strongest neighbor pilot network. In various embodiments, the network is from a set of networks including a serving pilot network, a preapproved pilot network, and an unapproved pilot network, and each of the serving pilot network, the preapproved pilot network, and the unapproved pilot network belong to a first base station.

In some embodiments, searching for a network for responding to the page message after the extended service request is completed may include determining whether a serving pilot network signal of the serving pilot network exceeds a first threshold, determining whether a preapproved pilot network signal of the preapproved pilot network exceeds a second threshold in response to determining that the serving pilot network signal does not exceed the first threshold, and determining whether an unapproved pilot network signal of the unapproved pilot network exceeds a third threshold in response to determining that the preapproved pilot network signal does not exceed the second threshold, and sending a page message response using the network may include sending the page message response using the serving pilot network in response to the serving pilot network signal exceeding the first threshold, sending the page message response using the preapproved pilot network in response to the preapproved pilot network signal exceeding the second threshold, and sending the page message response using the unapproved pilot network in response to the unapproved pilot network signal exceeding the third threshold.

In some embodiments, searching for a network for responding to the page message after the extended service request is completed may include identifying a strongest pilot network signal corresponding to the network from a set of pilot network signals including a serving pilot network signal of the serving pilot network, a preapproved pilot network signal of the preapproved pilot network, and an unapproved pilot network signal of the unapproved pilot network, and sending a page message response using the network may include sending the page message response using the network corresponding to the strongest pilot network signal.

Some embodiments may include searching for a preferred network for responding to the page message after the extended service request is completed while searching for the network for responding to the page message and while identifying the strongest neighbor pilot network. In such embodiments, sending a page message response using the network may include sending the page message response using the preferred network instead of the network in response to finding the preferred network, and sending a page message response using the strongest neighbor pilot network may include sending the page message response using the preferred network instead of the strongest neighbor pilot network in response to finding the preferred network.

Some embodiments may further include selecting one of the serving pilot network, the preapproved pilot network, the unapproved pilot network, and the strongest neighbor pilot network as the network. In such selections, if the preapproved pilot network is selected as the network then the preferred network is the serving pilot network, if the unapproved pilot network is selected as the network then the preferred network is selected from a group including the serving pilot network and the preapproved pilot network, and if the strongest neighbor pilot network is selected as the network then the preferred network is selected from a group including the serving pilot network, the preapproved pilot network, and the unapproved pilot network. Such embodiments may further include determining whether a preferred network signal exceeds a threshold, in which sending the page message response using the preferred network instead of the network may include sending the page message response using the preferred network in response to the preferred network signal exceeding the threshold, and in which sending the page message response using the preferred network instead of the strongest neighbor pilot network may include sending the page message response using the preferred network in response to the preferred network signal exceeding the threshold.

In some embodiments, receiving the page message for the mobile-terminated call may include receiving the page message for the mobile-terminated call in the serving pilot network. Such embodiments may further include receiving a first message specifying the preapproved pilot network, receiving a second message containing configuration information for the unapproved pilot network, and storing the preapproved pilot network and the unapproved pilot network.

Some embodiments may include ranking the serving pilot network higher than the preapproved pilot network, and the preapproved pilot network higher than the unapproved pilot network.

In some embodiments, the serving pilot network may include a first base station identifier, the preapproved pilot network may include a second base station identifier, the unapproved pilot network may include a third base station identifier, the strongest neighbor pilot network may include a fourth base station identifier, in which the first base station identifier, the second base station identifier, and the third base station identifier identify the first base station, and in which the fourth base station identifier identifies a second base station.

Some embodiments include a wireless communication device configured to respond to a page message for a mobile-terminated call by using a single radio Long-Term Evolution (LTE) mode having a radio frequency (RF) chain configured to transmit and receive wireless communication signals, and a processor communicatively connected to the RF chain and configured with processor-executable instructions to perform operations of one or more of the methods described above.

Some embodiments include a wireless communication device configured to respond to a page message for a mobile-terminated call by using a single radio Long-Term Evolution (LTE) mode having means for performing functions of one or more of the methods described above Some embodiments include a non-transitory processor-readable medium having stored thereon processor-executable software instructions to cause a processor of a wireless communication device to perform operations of one or more of the methods described above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
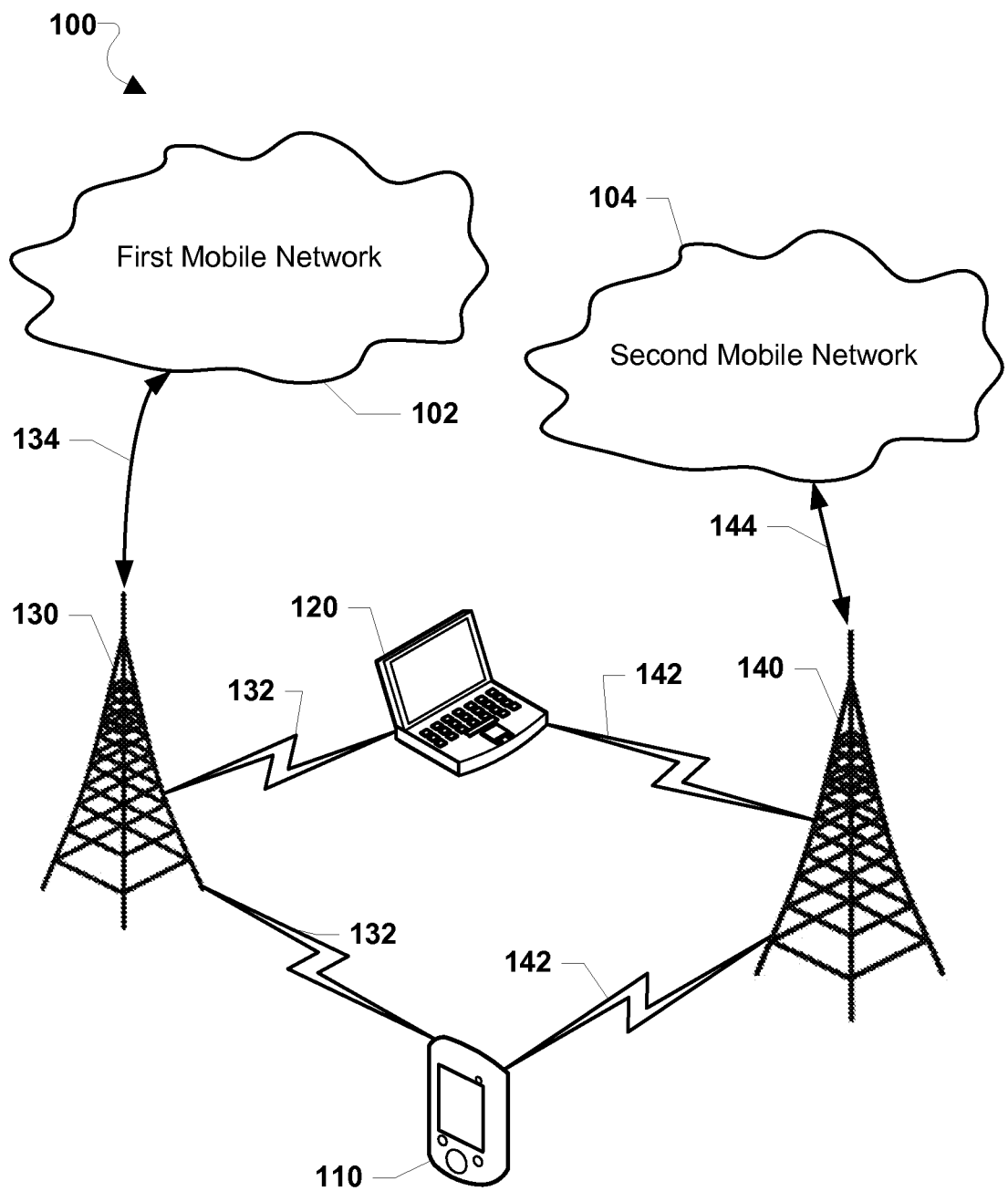
FIG. 1 is a communication system block diagram illustrating a network suitable for use with various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The term "wireless communication device" is used herein to refer to any one or all of cellular telephones, smartphones, personal or mobile multi-media players, personal data assistants (PDAs), laptop computers, tablet computers, smartbooks, ultrabooks, palm-top computers, wireless electronic mail receivers, multimedia Internet enabled cellular telephones, wireless gaming controllers, and similar personal electronic devices which include a memory, a programmable processor and wireless communication circuitry. As used herein, the term "multi-subscription" refers to a capability of a wireless communication device to transmit and receive radio frequencies using at least two radio access technologies (RAT), including a data radio access technology (e.g., Long-term Evolution (LTE)) and a voice radio access technology (e.g., any non-LTE voice radio access technology, such as Code Division Multiple Access (CDMA) based voice radio access technologies), implement by at least one radio frequency (RF) chain, or transmit/receive chain. In various embodiments a wireless communication device may be configured with a single radio LTE (SR-LTE) mode allowing for a data radio access technology and a voice radio access technology to use the same RF chain.

Descriptions of the various embodiments refer to multi-subscription enabled wireless communication devices, which may provide efficient management of voice call resources while using single radio LTE mode. The multi-subscription enabled wireless communication devices may select prioritized pilot networks to ensure that a mobile-terminated call can be executed by the wireless communication device during single radio LTE mode by avoiding a handoff procedure to another base station that may not have the mobile-terminated call context.

Various embodiments enhance operations of a wireless communication device in single radio LTE mode using a single RF chain to implement both LTE communications and voice radio access technology (such as CDMA2000 1× or any other voice radio access technology) communications when the wireless communication device receives a mobile-terminated call via the voice radio access technology.

In response to receiving a general page message for a mobile-terminated call, a wireless communication device in single radio LTE mode using a single RF chain to implement both LTE communications and voice radio access technology communications may execute an extended service request (ESR) to the LTE network to initiate a circuit switched fallback (CSFB) or an inter-radio access technology (IRAT) handover. In response to successful completion of extended service request procedures, the mobile-terminated call may be implemented using the same signal configuration parameters that were used to receive the mobile-terminated call. The signal configuration parameters may be defined by a serving pilot network signal, sometimes referred to herein as a first pilot network signal, for the received mobile-terminated call.

During the extended service request procedure, which takes at least 500 ms to complete, a serving pilot network signal may sometimes weaken or be interfered with, which is commonly referred known as fouling. When this happens, the wireless communication device may search for other pilot networks to complete the mobile terminated call. In various embodiments, to search for other pilot networks, the wireless communication device may store pilot network signal configuration parameters for various pilot network signals, and prioritize the various pilot networks based on similarity of the other pilot network signal configuration parameters to the serving pilot network signal configuration parameters. The various pilot networks that may be found during such a search and prioritized based on signal configuration parameters may include the serving pilot network, a preapproved pilot network, an unapproved pilot network, a third pilot network, and a strongest neighbor pilot network. The serving pilot network (referred to as the first pilot network) may be assigned the highest priority.

A preapproved pilot network (referred to as a second pilot network) may share an association with the same base station as the serving pilot network as indicated by a base station identifier (ID). A preapproved pilot network signal may share the same or similar pilot network signal configuration parameters as the serving pilot network signal. Therefore, the preapproved pilot network may be assigned a priority that is lower than the serving pilot network.

An unapproved pilot network (referred to as a third pilot network) may be associated with a neighboring network on the same base station as the serving pilot network as indicated by a base station identifier. An unapproved pilot network signal may share some of the same pilot network signal configuration parameters as the serving pilot network signal. Therefore, an unapproved pilot network may be assigned a priority that is lower than the preapproved pilot network.

A strongest neighbor pilot network (referred to herein as a fourth pilot network) may be associated with a neighboring base station to the base station of the serving pilot network as indicated by respective base station identifiers. A strongest neighbor pilot network signal may have pilot network signal configuration parameters that are the same or vary from the serving pilot network signal. Therefore, the strongest neighbor pilot network may be assigned a priority that is lower than the unapproved pilot network.

A pilot network associated with the same base station identifier as the serving pilot network may signify that the pilot network belongs to a base station having a context of the mobile-terminated call. Using the pilot network associated with the same base station identifier as the serving pilot network to respond to the general page message of the mobile-terminated call may preempt a handoff resulting in a previous network connection of the wireless communication device to the base station of the of the serving pilot network having the context of the mobile-terminated call changing to a network connection to a base station of the strongest neighbor pilot network not having the context of the mobile-terminated call. Connecting to the base station without the context of the mobile-terminated call may result in dropping the context of the mobile-terminated call, while connecting to the base station with the context of the mobile-terminated call may result in a successful initiation of the mobile-terminated call. Therefore, in various embodiments, having the same base station identifier as associated with the serving pilot network may be the most heavily weighted factor in determining the priority of the identified pilot networks, followed by the similarity of the pilot network signal configuration parameters.

In response to the serving pilot network signal fouling during the extended service request procedures, the wireless communication device may compare the preapproved pilot network signal and the unapproved pilot network signal to respective thresholds to determine whether either pilot network is suitable for use to execute the mobile-terminated call. In response to determining that only one of the preapproved pilot network and the unapproved pilot network is suitable for use to execute the mobile-terminated call, the wireless communication device may execute the mobile-terminated call using the suitable pilot network. In response to determining that both of the preapproved pilot network and the unapproved pilot network are suitable for use to execute the mobile-terminated call, the wireless communication device may select the pilot network with the higher priority.

In response to determining that neither of the preapproved pilot network and the unapproved pilot network is suitable for use to execute the mobile-terminated call, the wireless communication device may select the strongest neighbor pilot network, which may start a process to access a neighbor base station. However, while executing the access process to the neighbor base station of the strongest neighbor pilot network, the wireless communication device may continually search for the serving pilot network signal. In response to locating the serving pilot network signal, the wireless communication device may compare the serving pilot network signal to a respective threshold. In response to the serving pilot network signal comparing favorably to the threshold, the wireless communication device may use the serving pilot network to execute the mobile terminated call.

Using the prioritized order of the various pilot signals helps to ensure that the mobile-terminated call remains on a network of a base station with at least some context for the mobile-terminated call, unless conditions make it necessary to handoff to a neighbor base station, which may occur when only the strongest neighbor pilot network is useable. The probability of dropping the mobile-terminated call is reduced with the various embodiments, and dropping the mobile-terminated call may only occur when a handoff is executed to the neighbor base station of the strongest neighbor pilot network. As a result, connectivity may be improved by avoiding unnecessary handoffs to unknown systems, and connectivity may be improved near cellular network boundaries and when the voice technology signal is bad or fluctuating.

The various embodiments may be implemented in multi-subscription wireless communication devices that operate within a variety of communication systems 100, such as at least two mobile telephony networks, an example of which is illustrated in FIG. 1. A first mobile network 102 and a second mobile network 104 are typical mobile networks that include a plurality of cellular base stations 130 and 140. A first multi-subscription wireless communication device 110 may be in communication with the first mobile network 102 through a cellular connection 132 to a first base station 130. As described, in some embodiments the multi-subscription wireless communication device 110 may be a multi-SIM communication device. The first multi-subscription wireless communication device 110 may also be in communication with the second mobile network 104 through a cellular connection 142 to a second base station 140. The first base station 130 may be in communication with the first mobile network 102 over a connection 134. The second base station 140 may be in communication with the second mobile network 104 over a connection 144.

A multi-subscription wireless communication device 120 may similarly communicate with the first mobile network 102 through a cellular connection 132 to a first base station 130. The second multi-subscription wireless communication device 120 may communicate with the second mobile network 104 through a cellular connection 142 to the second base station 140. The cellular connections 132 and 142 may be made through two-way wireless communication links using a variety of communication technologies, such as Long Term Evolution (LTE), fourth generation (4G), third generation (3G), Code Division Multiple Access (CDMA), Time Division Synchronous Code Division Multiple Access (TD-SCDMA), Wideband Code Division Multiple Access (WCDMA), Global System for Mobile communication (GSM), and other mobile telephony communication technologies. Other connections may include various other wireless connections, including WLANs, such as Wi-Fi based on Institute of Electrical and Electronics Engineers (IEEE) 802.11 standards, and wireless location services, such as the Global Positioning System (GPS).

Figure 2:
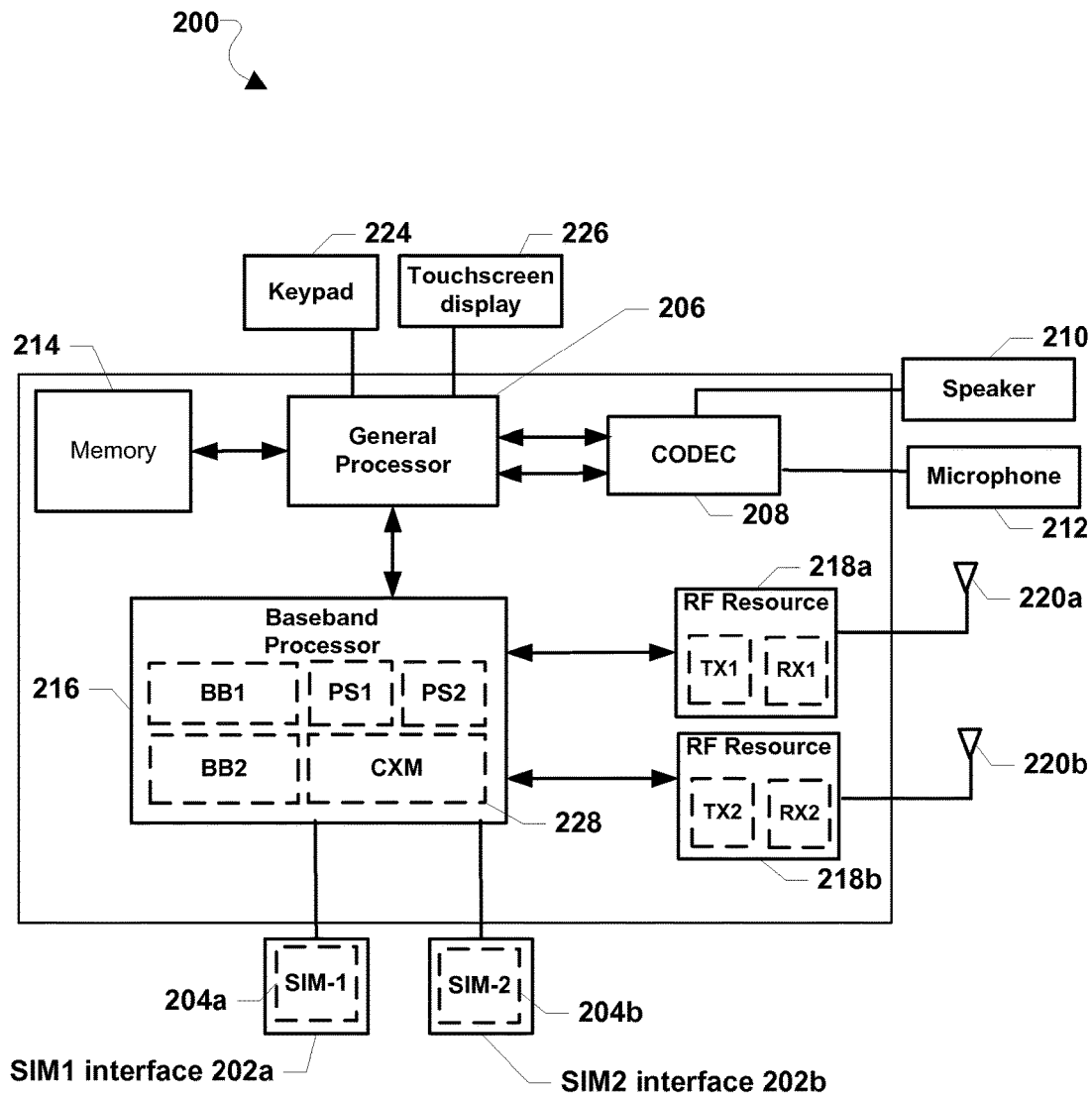
FIG. 2 is a component block diagram illustrating various embodiments of a wireless communication device configured with multi-subscription capabilities.

FIG. 2 illustrates components of a multi-subscription wireless communication device 200 that is a dual-technology wireless communication device (e.g., 110, 120 in FIG. 1) that is suitable for implementing the various embodiments. With reference to FIGS. 1 and 2, the multi-subscription wireless communication device 200 may include a first subscriber identity module (SIM) interface 202a, which may receive a first identity module SIM-1 204a that is associated with the first subscription. The multi-subscription wireless communication device 200 may also be a multi-SIM wireless communication device by including a second (or more) SIM interface 202b, which may receive a second identity module SIM-2 204b that is associated with a second subscription.

A SIM in the various embodiments may be a Universal Integrated Circuit Card (UICC) that is configured with SIM and/or Universal SIM (USIM) applications, enabling access to, for example, GSM, and/or Universal Mobile Telecommunications System (UMTS) networks. The UICC may also provide storage for a phone book and other applications. Alternatively, in a CDMA network, a SIM may be a UICC removable user identity module (R-UIM) or a CDMA subscriber identity module (CSIM) on a card.

Each SIM may have a CPU, ROM, RAM, EEPROM and I/O circuits. A SIM used in the various embodiments may contain user account information, an international mobile subscriber identity (IMSI), a set of SIM method application toolkit (SAT) commands and storage space for phone book contacts. A SIM may further store a Home Public-Land-Mobile-Network (HPLMN) code to indicate the SIM card network operator provider. An Integrated Circuit Card Identity (ICCID) SIM serial number may be printed on the SIM for identification.

Each multi-subscription wireless communication device 200 may include at least one controller, such as a general purpose processor 206, which may be coupled to a coder/decoder (CODEC) 208. The CODEC 208 may be coupled to a speaker 210 and a microphone 212. The general purpose processor 206 may also be coupled to at least one memory 214. The memory 214 may be a non-transitory tangible computer readable storage medium that stores processor-executable instructions. For example, the instructions may include routing communication data relating to the first or second subscription though a corresponding baseband-RF resource chain, or RF chain.

The memory 214 may store operating system (OS) software, as well as user application software and executable instructions. The memory 214 may also store application data, such as an array data structure.

The general purpose processor 206 and memory 214 may each be coupled to at least one baseband modem processor 216. In various embodiments each SIM in the multi-subscription wireless communication device 200 (e.g., SIM-1 202a and SIM-2 202b) may be associated with a baseband-RF resource chain. In various embodiments, multiple SIMs may be associated with a common baseband-RF resource chain shared by two or more SIMs, or a SIM may be associated with a dedicated baseband-RF resource chain. Each baseband-RF resource chain may include the baseband modem processor 216 to perform baseband/modem functions for communications on a SIM, and one or more amplifiers and radios, referred to generally herein as RF resources 218a, 218b. In some embodiments, baseband-RF resource chains may interact with a shared baseband modem processor 216 (i.e., a single device that performs baseband/modem functions for all SIMs on the wireless communication device). Alternatively, each baseband-RF resource chain may include physically or logically separate baseband processors (e.g., BB1, BB2).

In some embodiments, the baseband modem processor 216 may be an integrated chip capable of managing the protocol stacks of each of the SIMs or subscriptions (e.g., PS1, PS1) and implementing a co-existence manager software 228 (CXM). By implementing modem software, subscription protocol stacks, and the co-existence manager software on this integrated baseband modem processor 216, thread based instructions may be used on the integrated baseband modem processor 216 to communicate instructions between the software implementing the interference prediction, the mitigation techniques for co-existence issues, and the Rx and Tx operations.

The RF resources 218a, 218b may be communication circuits or transceivers that perform transmit/receive functions for the associated SIM of the wireless communication device. The RF resources 218a, 218b may be communication circuits that include separate transmit and receive circuitry, or may include a transceiver that combines transmitter and receiver functions. The RF resources 218a, 218b may be coupled to a wireless antenna (e.g., a first wireless antenna 220a and a second wireless antenna 220b). The RF resources 218a, 218b may also be coupled to the baseband modem processor 216.

In some embodiments, the general purpose processor 206, memory 214, baseband processor(s) 216, and RF resources 218a, 218b may be included in the multi-subscription wireless communication device 200 as a system-on-chip. In other embodiments, the first and second SIMs 202a, 202b and their corresponding interfaces 204a, 204b may be external to the system-on-chip. Further, various input and output devices may be coupled to components on the system-on-chip, such as interfaces or controllers. Example user input components suitable for use in the multi-subscription wireless communication device 200 may include, but are not limited to, a keypad 224 and a touchscreen display 226.

In some embodiments, the keypad 224, touchscreen display 226, microphone 212, or a combination thereof, may perform the function of receiving the request to initiate an outgoing call. For example, the touchscreen display 226 may receive a selection of a contact from a contact list or receive a telephone number. In another example, either or both of the touchscreen display 226 and microphone 212 may perform the function of receiving a request to initiate an outgoing call. For example, the touchscreen display 226 may receive selection of a contact from a contact list or receive the input of a telephone number. As another example, the request to initiate the outgoing call may be in the form of a voice command received via the microphone 212. Interfaces may be provided between the various software modules and functions in the multi-subscription wireless communication device 200 to enable communication between them, as is known in the art.

In some embodiments, the multi-subscription wireless communication device 200 may instead be a single-technology or multiple-technology device having more or less than two RF chains. Further, various embodiments may be implemented in single RF chain or multiple RF chain wireless communication devices with fewer SIM cards than the number of RF chains, including devices that do not use any physical SIM cards relying instead on virtual SIM applications. In various embodiments, the multi-subscription wireless communication device 200 having a common baseband-RF resource chain may be capable of operating in a single radio LTE mode to allow multiple radio access technologies to share the common baseband-RF resource chain.

Figure 3:
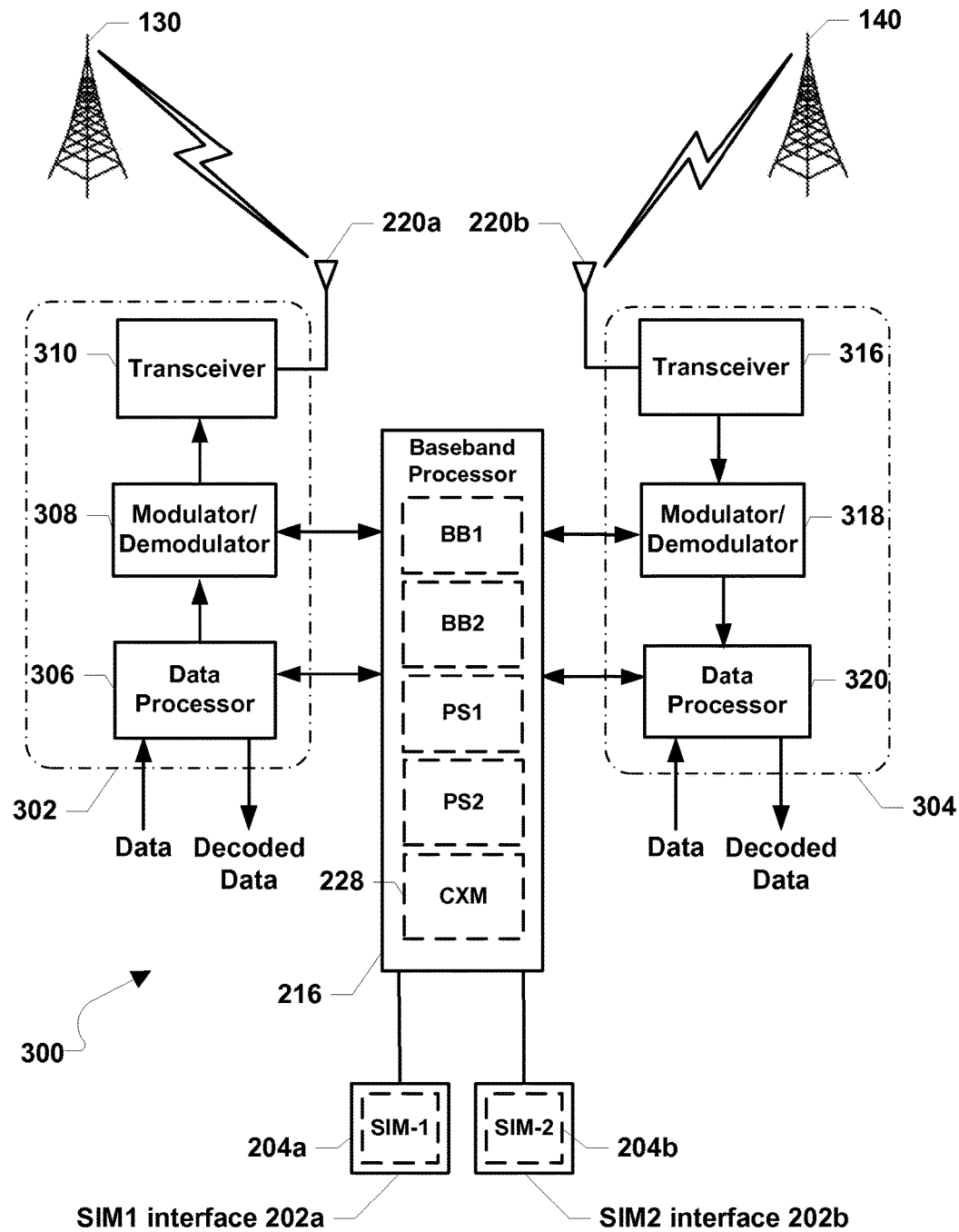
FIG. 3 is a component block diagram illustrating an interaction between components of different transmit/receive chains in various embodiments of a wireless communication device configured with multi-subscription capabilities.

FIG. 3 illustrates interactions between components of different RF chains, or transmit/receive chains in a multi-subscription wireless communication device 300 according to some embodiments. With reference to FIGS. 1-3, the multi-subscription wireless communication device 300 may be configured to communicate with two or more base stations 130, 140 using two different radio access technologies. The multi-subscription wireless communication device 300 may include a first radio technology RF chain 302 including one RF resource 218a, and a second radio technology RF chain 304 including another RF resource 218b. The first and second radio technology RF chains 302, 304 may include components operable for transmitting data. The multi-subscription wireless communication device 300 may include a data processor 306, 320 configured to format, encode, and interleave data to be transmitted. The multi-subscription wireless communication device 300 may include a modulator/demodulator 308, 318 configured to modulate a carrier signal with encoded data, for example, by performing Gaussian minimum shift keying (GMSK). The multi-subscription wireless communication device 300 may include one or more transceiver circuits 310, 316 configured to condition the modulated signal (e.g., by filtering, amplifying, and up-converting) to generate a RF modulated signal for transmission. The RF modulated signal may be transmitted to a base station 130, 140 via an antenna 220a, 220b.

The components of the first and second radio technology RF chains 302, 304 may also be operable to receive data. When receiving data, the antenna 220a, 220b may receive modulated RF signals from a base station 130, 140. The one or more transceiver circuits 310, 316 may condition (e.g., filter, amplify, and down-convert) the received RF modulated signal, digitize the conditioned signal, and provide samples to the modulator/demodulator 308, 318. The modulator/demodulator 308, 318 may extract the original information-bearing signal from the modulated carrier wave, and may provide the demodulated signal to the data processor 306, 320. The data processor 306, 320 may de-interleave and decode the signal to obtain the original, decoded data, and may provide decoded data to other components in the wireless communication device.

Operations of the first and second radio technology RF chains 302, 304 may be controlled by a processor, such as a baseband processor(s) 216. Each of the first and second radio technology RF chains 302, 304 may be implemented as circuitry that may be separated into respective receive and transmit circuits (not shown). Alternatively, the first and second radio technology RF chains 302, 304 may combine receive and transmit circuitry (e.g., as transceivers associated with SIM-1 and SIM-2 in FIG. 2).

Figure 4:
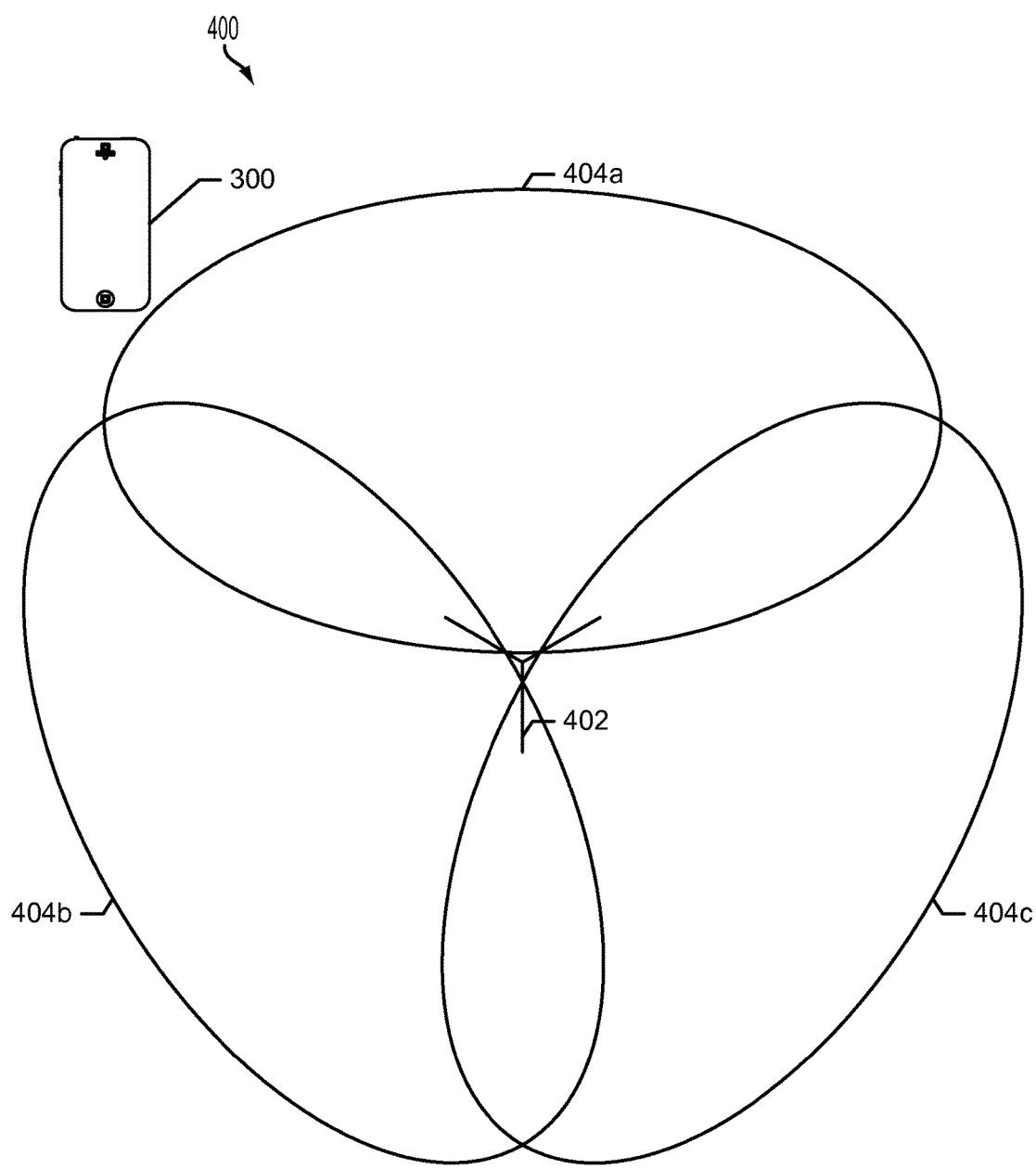
FIG. 4 is a schematic diagram illustrating multiple pilot networks of a wireless communication base station.

FIG. 4 illustrates multiple pilot networks 404a, 404b, 404c of a wireless communication base station 402 according to various embodiments. A wireless communication base station (or base station) 402 may host a set of pilot networks 400, which may include one or more pilot networks, for example pilot networks 404a-404c. The example illustrated in FIG. 4 shows three pilot networks 404a-404c as an example that is not limiting in the type or number of pilot networks that a base station may host. The pilot networks 404a-404c may be implemented using the same or different radio access technologies. With reference to FIGS. 1-4, in various embodiments, a multi-subscription wireless communication device 300 (which may be similar to the multi-subscription wireless communication devices 110, 120, 200) may be capable of communicating over one or more of the pilot networks 404a-404c. The pilot networks 404a-404c may each have an individual range and signal strength that may be set to be constant or set to fluctuate due to predetermined factors. The range and signal strength of each of the pilot networks 404a-404c may also fluctuate due to power, connection load, signal interference, equipment, and environmental conditions.

The pilot networks 404a-404c may each be implemented using a non-LTE voice radio access technology, such as a CDMA based voice radio access technology. The multi-subscription wireless communication device 300 may be capable of communicating using the non-LTE voice radio access technology and over each of the pilot networks 404a-404c.

In various embodiments, the multi-subscription wireless communication device 300 may be configured to categorize the pilot networks 404a-404c. A pilot network 404a-404c over which the multi-subscription wireless communication device 300 receives a general page message for initiating a mobile-terminated call may be categorized as a serving pilot network. The multi-subscription wireless communication device 300 may receive messages from the base station 402 categorizing some of the pilot networks 404a-404c and/or providing pilot network signal configuration parameters for the pilot networks 404a-404c. The multi-subscription wireless communication device 300 may receive the messages periodically, and the messages may update or replace the information of the previous messages. In various embodiments, the messages may update or replace the information of the previous messages based on a connection for the multi-subscription wireless communication device 300 to the base station 402 over one of the pilot networks 404a-404c.

In operation, the multi-subscription wireless communication device 300 may receive a first message specifying at least one preapproved pilot network, which may be a pilot network that is hosted by the base station 402 and is known by the base station 402 to be configured such that the wireless communication device 300 will be able to execute the mobile-terminated call when switching from a serving pilot network to a preapproved pilot network. The first message may include a pilot network identifier (ID), a base station identifier (ID), and/or pilot network signal configuration parameters for the preapproved pilot networks.

The multi-subscription wireless communication device 300 may also receive a second message containing a pilot network identifier, a base station identifier, and/or pilot network signal configuration parameters for at least one unapproved pilot network. The unapproved pilot networks may include pilot networks hosted by the base station 402 that may not be known by the base station 402 to be configured such that the wireless communication device 300 will be able to execute the mobile-terminated call when switching from a serving pilot network to an unapproved pilot network.

The multi-subscription wireless communication device 300 may be able to execute the mobile-mobile terminated call on any of the serving pilot network, preapproved pilot network, and unapproved pilot network of the same base station 402 since the base station 402 has context of the mobile-terminated call.

In various examples, the multi-subscription wireless communication device 300 may receive a general page message from the base station 402 while within range of the pilot network 404a, thereby receiving the general page message over the pilot network 404a. The wireless communication device 300 and/or the base station 402 may categorize the pilot network 404a as the serving pilot network 404a. The multi-subscription wireless communication device 300 may be operating in a single radio LTE mode and may have to disconnect from the serving pilot network 404a and wait a period, such as 500 ms, before the wireless communication device 300 is able to respond to the general page message. During that period, the wireless communication device 300 may move out of the range of the serving pilot network 404a or the quality of the serving pilot network signal may deteriorate, or foul. In either instance, the multi-subscription wireless communication device 300 may not be able to reconnect with the serving pilot network 404a to respond to the general page message. As discussed in further detail herein, when this happens, the multi-subscription wireless communication device 300 may select one of the other pilot networks 404b or 404c of the base station 402 to connect to and respond to the general page message. As an example, the multi-subscription wireless communication device 300 may recognize the preapproved pilot network 404b as a preapproved pilot network, and may recognize the unapproved pilot network 404c as an unapproved pilot network.

The multi-subscription wireless communication device 300 may connect to either the higher ranked pilot network 404b, 404c meeting a designated connection criterion, or the pilot network 404b, 404c having the strongest pilot network signal. The multi-subscription wireless communication device 300 may respond to the general page message once connected to the preapproved pilot network 404b or the unapproved pilot network 404c.

In some instances, before the multi-subscription wireless communication device 300 responds to the general page message over the preapproved pilot network 404b or the unapproved pilot network 404c, the multi-subscription wireless communication device 300 may travel back into range of the serving pilot network 404a, or the quality of the serving pilot network signal may improve such that the multi-subscription wireless communication device 300 may reconnect to the serving pilot network 404a. In such instances, the multi-subscription wireless communication device 300 may connect to the serving pilot network 404a in order to respond to the general page message.

Similarly, in instances in which the multi-subscription wireless communication device 300 is selected to connect to the unapproved pilot network 404c, the multi-subscription wireless communication device 300 may move into range of the preapproved pilot network 404b, or the quality of the preapproved pilot network signal may improve such that the multi-subscription wireless communication device 300 may connect to the preapproved pilot network 404b before the multi-subscription wireless communication device 300 responds to the general page message. In such instances, the multi-subscription wireless communication device 300 may connect to the preapproved pilot network 404b in order to respond to the general page message.

Figure 5:
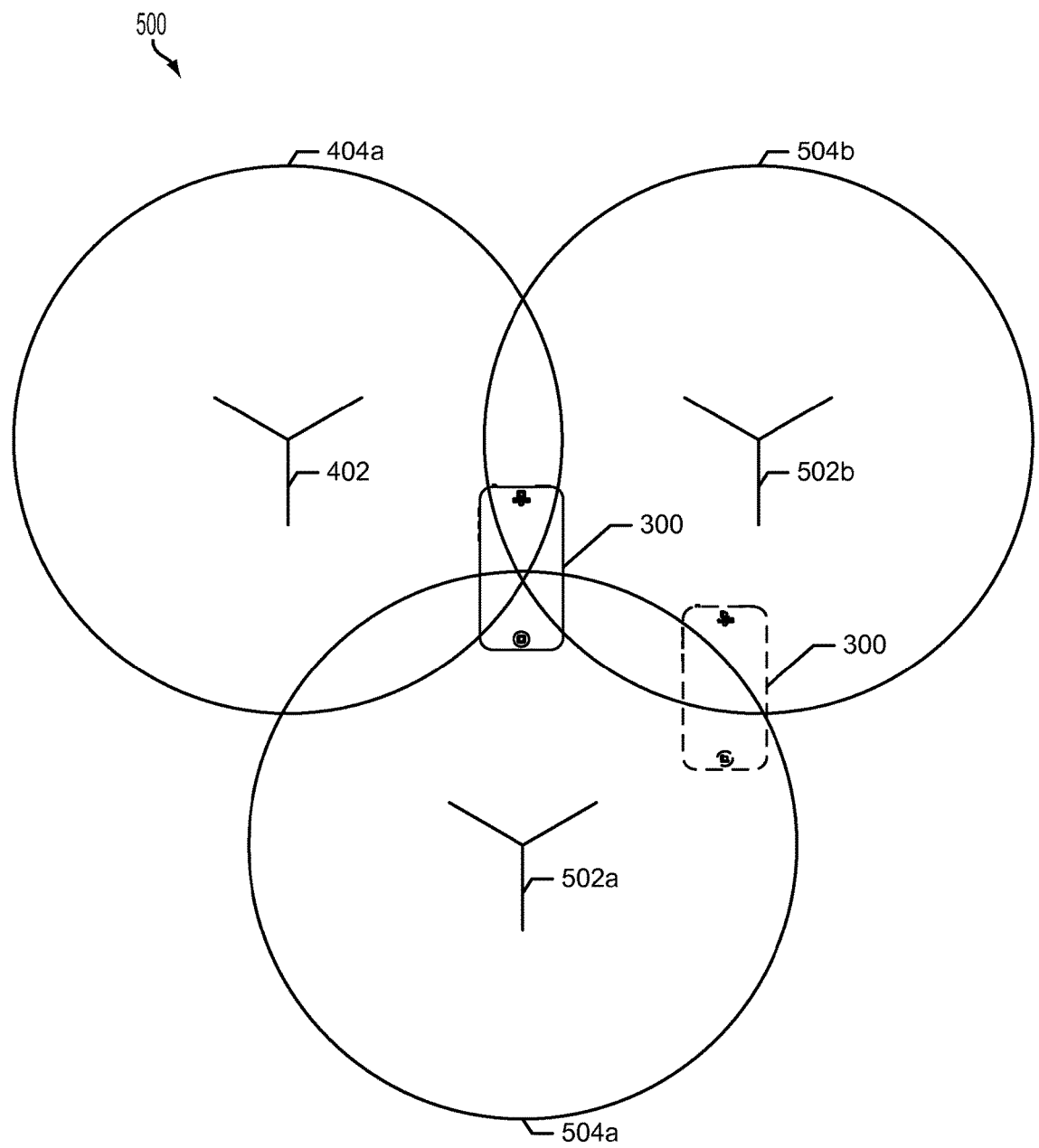
FIG. 5 is a schematic diagram illustrating multiple pilot networks of a wireless communication network according to various embodiments.

FIG. 5 illustrates multiple pilot networks 404a, 504a, 504b of a wireless communication network 500. In various embodiments, a wireless communication network 500 may include various pilot networks, for example pilot networks 404a, 504a, 504b hosted by a number of base stations 402, 502a, 502b. The example illustrated in FIG. 5 shows three pilot networks 404a, 504a, 504b and three base stations 402, 502a, 502b as an example that is not limiting in the type or number of pilot networks and base stations.

With reference to FIGS. 1-5, in various embodiments, the pilot networks 404a, 504a, 504b may be implemented using the same or different radio access technologies. A multi-subscription wireless communication device 300 (which may be similar to the multi-subscription wireless communication devices 110, 120, 200) may be capable of communicating via two or more of the pilot networks 404a, 504a, 504b in the wireless communication network 500. The pilot networks 404a, 504a, 504b may each have an individual range and signal strength that may be set to be constant or set to fluctuate due to predetermined factors. The range and signal strength of each of the pilot networks 404a, 504a, 504b may also fluctuate due to power, connection load, signal interference, equipment, and environmental conditions.

In various embodiments, the pilot networks 404a, 504a, 504b may each be implemented using a non-LTE voice radio access technology, such as a CDMA based voice radio access technology. The wireless communication device 300 may be capable of communicating using the non-LTE voice radio access technology and may communicate over each of the pilot networks 404a, 504a, 504b. The wireless communication device 300 may categorize the pilot networks 404a, 504a, 504b. A pilot network 404a, 504a, 504b over which the wireless communication device receives a general page message for initiating a mobile-terminated call may be categorized as a serving pilot network.

The wireless communication device 300 may receive messages from the base stations 402, 502a, 502b providing pilot network signal configuration parameters for the pilot networks 404a, 504a, 504b. The wireless communication device 300 may receive the messages periodically, and the messages may update or replace the information of the previous messages. The messages may update or replace the information of the previous messages based on a connection for the wireless communication device 300 to one of the base stations 402, 502a, 502b over one of the pilot networks 404a, 504a, 504b.

Similar to the second message described with reference to the network 400, the wireless communication device 300 may receive a third message containing a pilot network identifier, a base station identifier, and/or pilot network signal configuration parameters for at least one neighbor pilot network. The neighbor pilot networks may include pilot networks hosted by neighbor bases stations that are not the base station hosting the serving pilot network. The wireless communication device 300 may not be able to execute the mobile-mobile terminated call on a neighbor pilot network since a neighbor base station does not have context of the mobile-terminated call of the base station hosting the serving pilot network.

In some instances, the wireless communication device 300 may receive a general page message from the base station 402 while within range of the pilot network 404a, thereby receiving the general page message over the pilot network 404a. The wireless communication device 300 and/or the base station 402 may categorize the pilot network 404a as the serving pilot network 404a.

If the wireless communication device 300 is operating in a single radio LTE mode the wireless communication device 300 may have to disconnect from the serving pilot network 404a and wait a period, such as 500 ms, before the wireless communication device 300 is be able to respond to the general page message. During this period, the wireless communication device 300 may move out of the range of the serving pilot network 404a (e.g., illustrated in dashed lines) or the quality of the serving pilot network signal may deteriorate, or foul. In either instance, the wireless communication device 300 may not be able to reconnect with the serving pilot network 404a to respond to the general page message. Further, the wireless communication device 300 may not be in range of any preapproved pilot network or unapproved pilot network of the base station 402, or the quality of quality of the preapproved pilot network signal or the unapproved pilot network signal may insufficient to respond to the general page message. As discussed in further detail herein, the wireless communication device 300 may select the neighbor pilot network 504a or 504b of the neighbor base station 502a or 502b with the strongest neighbor pilot network signal (i.e., the strongest neighbor pilot network) to connect to and respond to the general page message. The wireless communication device 300 may respond to the general page message once connected to the strongest neighbor pilot network 504a or 504b.

However, in some instances, before the wireless communication device 300 responds to the general page message over the strongest neighbor pilot network 504a or 504b, the wireless communication device 300 may move back into range of the serving pilot network 404a, or the quality of the serving pilot network signal may improve such that the wireless communication device 300 may reconnect to the serving pilot network 404a. In such instances, the wireless communication device 300 may connect to the serving pilot network 404a in order to respond to the general page message.

Similarly, before the wireless communication device 300 responds to the general page message over the strongest neighbor pilot network 504a or 504b, the wireless communication device 300 may move into range of the preapproved pilot network 404b or the unapproved pilot network 404c (in FIG. 4), or the quality of the preapproved pilot network signal or the unapproved pilot network signal may improve such that the wireless communication device 300 may connect to the preapproved pilot network or the unapproved pilot network. In such instances, the wireless communication device 300 may connect to the preapproved pilot network or the unapproved pilot network in order to respond to the general page message.

Figure 6:
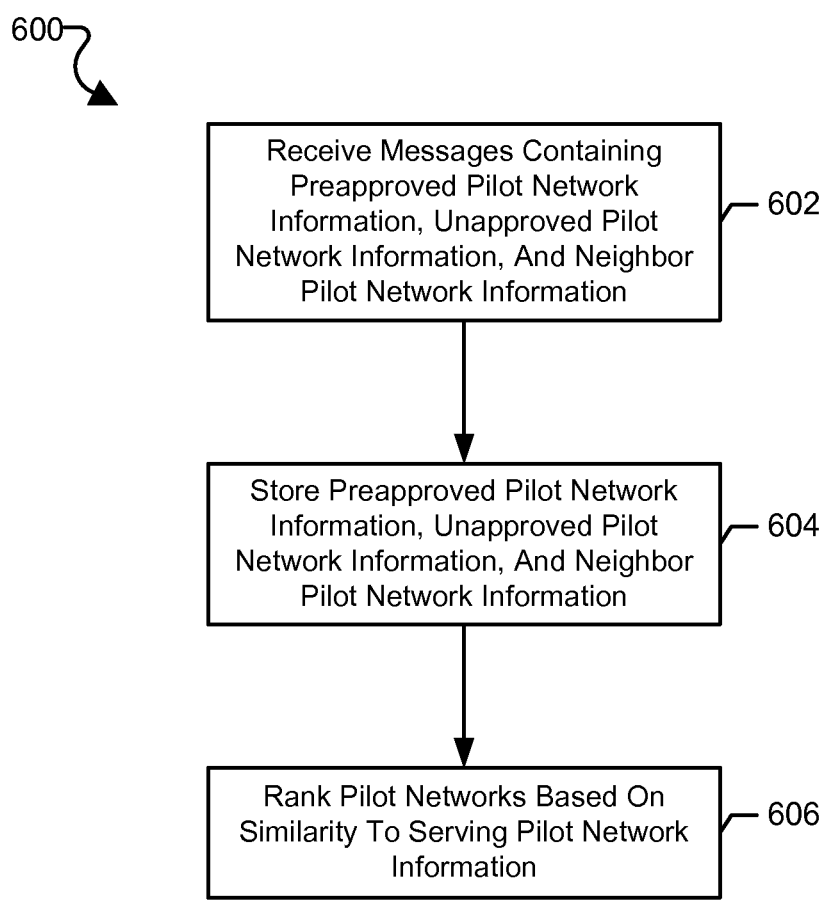
FIG. 6 is a process flow diagram illustrating a method for managing information for multiple pilot networks according to various embodiments.

FIG. 6 illustrates a method 600 for managing information for multiple pilot networks according to various embodiments. With reference to FIGS. 1-6, the method 600 may be executed in a wireless communication device, such as a wireless communication device (e.g., 110, 120, 200, 300) using software, general purpose or dedicated hardware, or a combination of software and hardware, such as a general purpose processor (e.g., 206), a baseband processor (e.g., 216) or the like.

In block 602, the wireless communication device may receive messages containing preapproved pilot network information, unapproved pilot network information, and neighbor pilot network information. As discussed herein, the wireless communication device may receive a first message specifying a preapproved pilot network, a second message specifying an unapproved pilot network, and a third message specifying a neighbor pilot network. The first message and the second message may be received from the same base station that hosts the serving pilot network, and the third message may be received from a neighbor base station that does not host the serving pilot network. Each of the first message, the second message, and the third message may contain a pilot network identifier, a base station identifier, and/or pilot network signal configuration parameters for the respective pilot networks of the preapproved pilot network, the unapproved pilot network, and the neighbor pilot network, respectively.

In block 604, the wireless communication device may store information received in the first message (preapproved pilot network information), the second message (unapproved pilot network information), and the third message (neighbor pilot network information) in a memory device (e.g., 214) of the wireless communication device.

In block 606, the wireless communication device may rank the pilot networks based on their similarity to the serving pilot network. In various embodiments, the wireless communication device may rank the rank the pilot networks in order of a likelihood of executing the mobile-terminated call, with the pilot network having the greatest likelihood of executing the mobile-terminated call being ranked highest. In some embodiments, the wireless communication device may base the ranking on whether a pilot network is designated as serving pilot network, a preapproved pilot network, an unapproved pilot network, or a neighbor pilot network. In some embodiments, the wireless communication device may base the ranking on whether a pilot network has a base station identifier that is the same or different from the base station identifier of the serving pilot network. In some embodiments, the wireless communication device may base the ranking on whether a pilot network has pilot network signal configuration parameters that are the same as or different from the base station identifier of the serving pilot network. Different pilot network signal configuration parameters, such as configuration parameters that indicate a stronger likelihood of a successful mobile-terminated call, may be given greater weight for purposes of ranking the pilot networks.

In some embodiments, the serving pilot network may be the most preferred pilot network. In some embodiments, a preapproved pilot network may be more preferred than an unapproved pilot network. In some embodiments, a neighbor pilot network may be a least preferred pilot network. In some embodiments, combinations of these criteria may be used to determine the ranking of the pilot networks, such as using one or more criteria to determine a ranking between pilot networks of different types, and using one or more of the same or different criteria to determine a ranking of pilot networks that are of the same type. For example, a pilot network designation and/or base station identifier may be used to determine that a preapproved pilot network ranks higher than an unapproved pilot network, and that the unapproved pilot network ranks higher than a neighbor pilot network. In addition, pilot network signal configuration parameters may be used to determine that a first unapproved pilot network ranks higher than a second unapproved pilot network.

Figure 7:
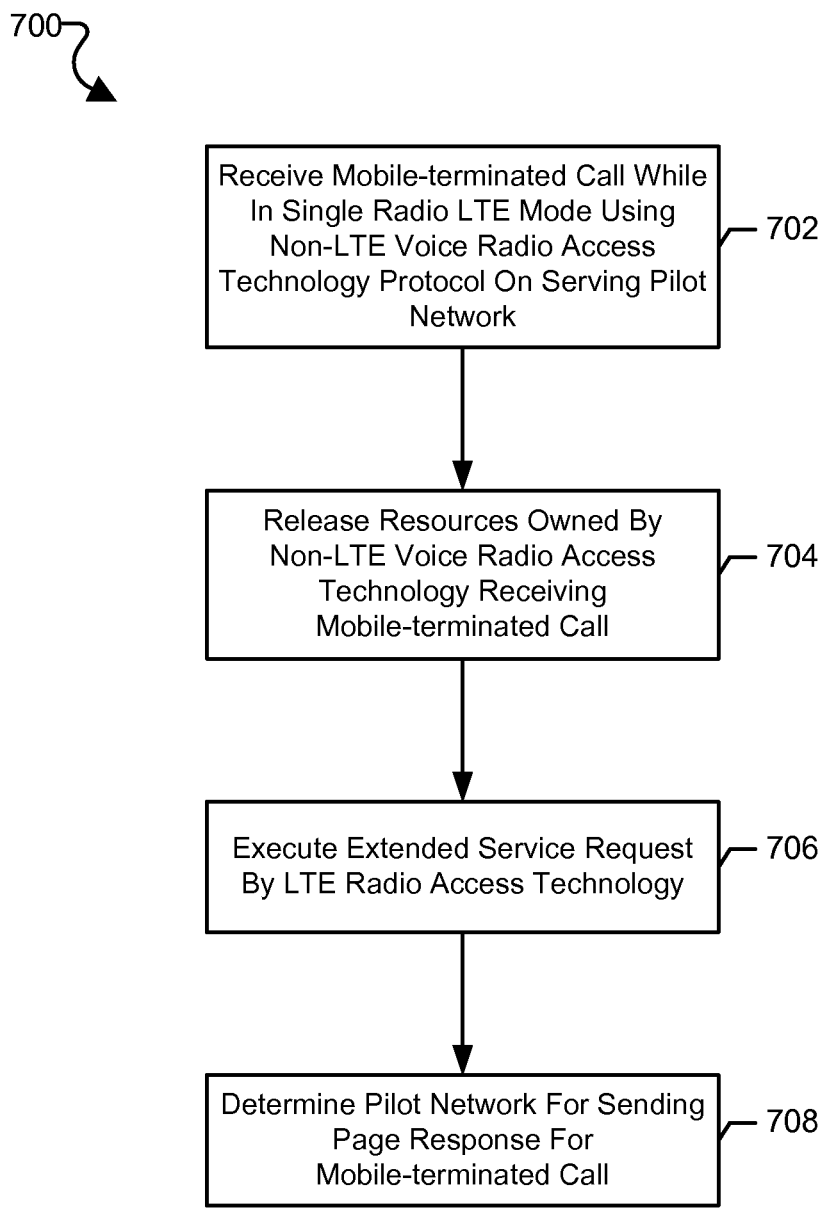
FIG. 7 is a process flow diagram illustrating a method for handling a general page message of a mobile-terminated call while operating in a single radio LTE mode according to various embodiments.

FIG. 7 illustrates a method 700 for handling a general page message of a mobile-terminated call while operating in a single radio LTE mode according to various embodiments. With reference to FIGS. 1-7, the method 700 may be executed in a wireless communication device (e.g., 110, 120, 200, 300) using software, general purpose or dedicated hardware, or a combination of software and hardware, such as a general purpose processor (e.g., 206), a baseband processor (e.g., 216) or the like.

In block 702, the wireless communication device may receive a mobile-terminated call while in single radio LTE mode using a non-LTE voice radio access technology protocol on a serving pilot network. In various embodiments, receiving the mobile-terminated call may begin with receiving a general page message for the mobile-terminated call, and the mobile-terminated call may not be initiated with the wireless communication device until after the wireless communication device responds to the general page message.

In block 704, the wireless communication device may release resources owned by the non-LTE voice radio access technology receiving mobile-terminated call. Since the RF resources of an RF chain are shared by multiple radio access technologies for the wireless communication device operating in single radio LTE mode, a first radio access technology may own the RF resources needed to transmit or receive communications using the RF chain when a second radio access technology may be set to execute a transmission or reception. To allow the second radio access technology to execute a transmission or reception, the first radio access technology may release ownership of at least the RF resources needed for executing a transmission or reception by the second radio access technology. For example, a non-LTE voice radio access technology receiving a page message for a mobile-terminated call may release at least ownership of the RF resources need to execute an extended service request by an LTE radio access technology.

In block 706, the wireless communication device may execute an extended service request using an LTE radio access technology.

In block 708, the wireless communication device may determine a pilot network for sending a response to the general page message for the mobile-terminated call, as discussed in detail with reference to FIGS. 8-10.

Figure 8:
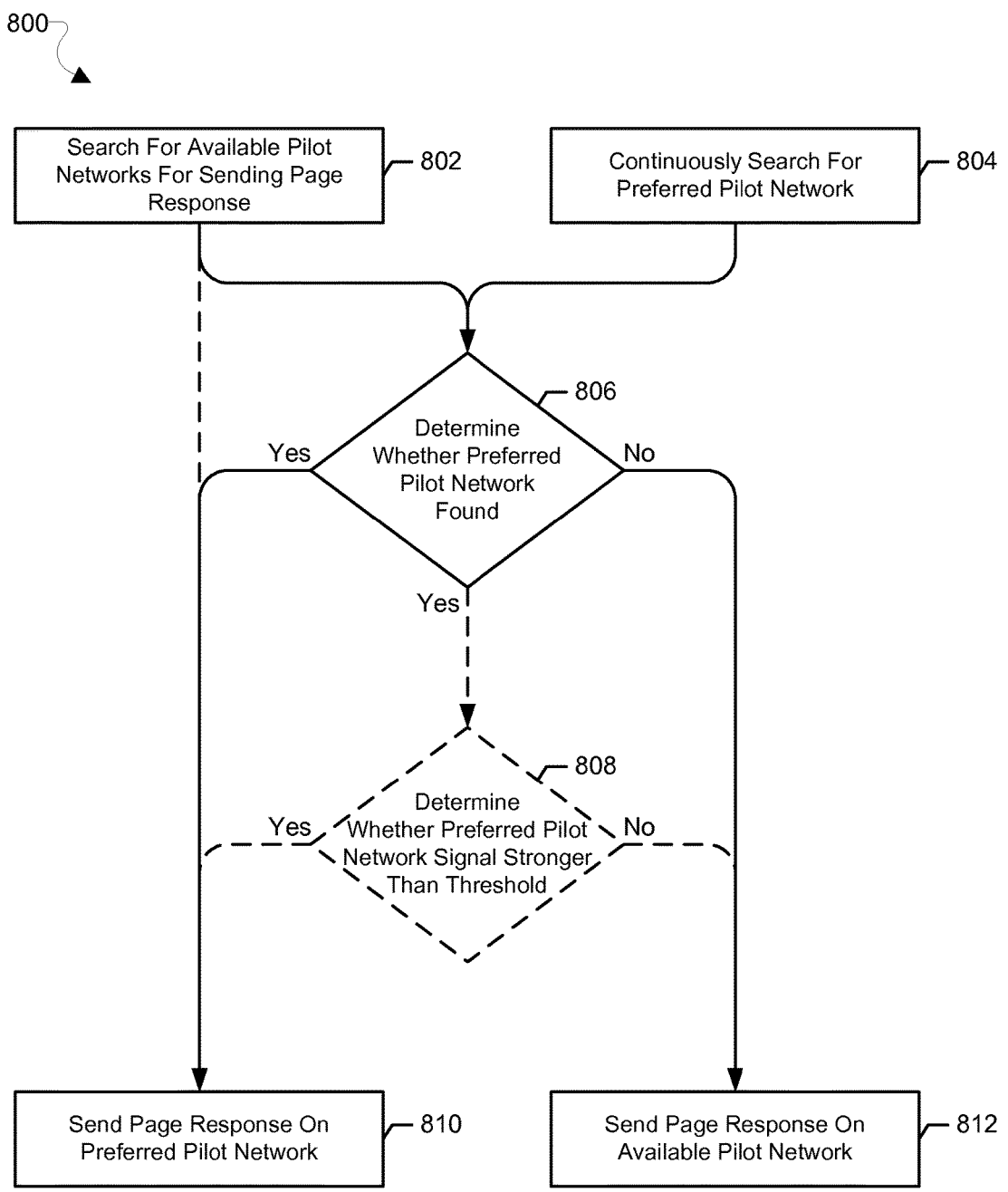
FIG. 8 is a process flow diagram illustrating a method for responding to a general page message of a mobile-terminated call while operating in a single radio LTE mode according to various embodiments.

FIG. 8 illustrates a method 800 for responding to a general page message of a mobile-terminated call while operating in a single radio LTE mode according to various embodiments. With reference to FIGS. 1-8, the method 800 may be executed in a wireless communication device, such as a wireless communication device (e.g., 110, 120, 200, 300) using software, general purpose or dedicated hardware, or a combination of software and hardware, such as a general purpose processor (e.g., 206), a baseband processor (e.g., 216) or the like.

In block 802, the wireless communication device may search for available pilot networks for sending a response to the general page message of the mobile-terminated call. In various embodiments, the wireless communication device may select one of the pilot networks (as described with reference to FIGS. 9 and 10) corresponding to the information associated with each pilot network stored in the memory of the wireless communication device (as described with reference to FIG. 6).

In block 804 (which may be concurrent with block 802), the wireless communication device may search for a preferred pilot network for sending the response to the general page message of the mobile-terminated call. In various embodiments, a preferred pilot network may be a pilot network with a higher ranking or better likelihood of successfully executing the mobile-terminated call, as described with reference to the method 600. In various embodiments, a preferred pilot network may be a pilot network among a set of pilot networks, for example, including a preapproved pilot network and an unapproved pilot network, having a stronger pilot network signal. Searching for a preferred pilot network may occur continuously, even after finding an available pilot network for sending a response to the general page message of the mobile-terminated call. In various embodiments, searching for a preferred pilot network may occur until the response to the general page message is sent. In some embodiments, searching for a preferred pilot network may occur after finding a preferred pilot network to search for a more preferred pilot network. In various embodiments, the wireless communication device may select one of the pilot networks (as described with reference to FIGS. 9 and 10) corresponding to the information associated with each pilot network stored in the memory of the wireless communication device (as described with reference to FIG. 6).

Figure 9:
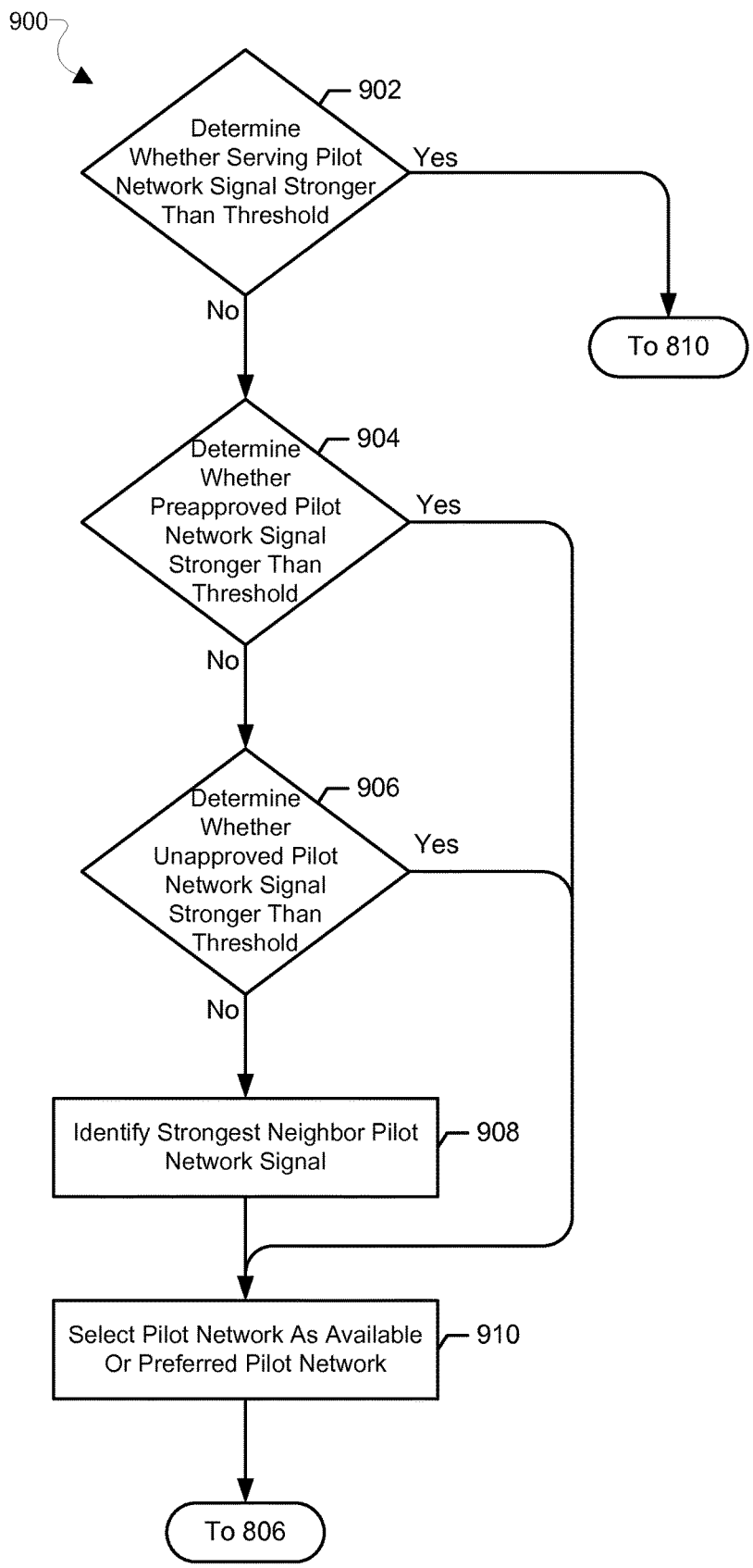
FIG. 9 is a process flow diagram illustrating a method for searching for an available or preferred pilot network for responding to a general page message of a mobile-terminated call while operating in a single radio LTE mode according to various embodiments.
Figure 10:
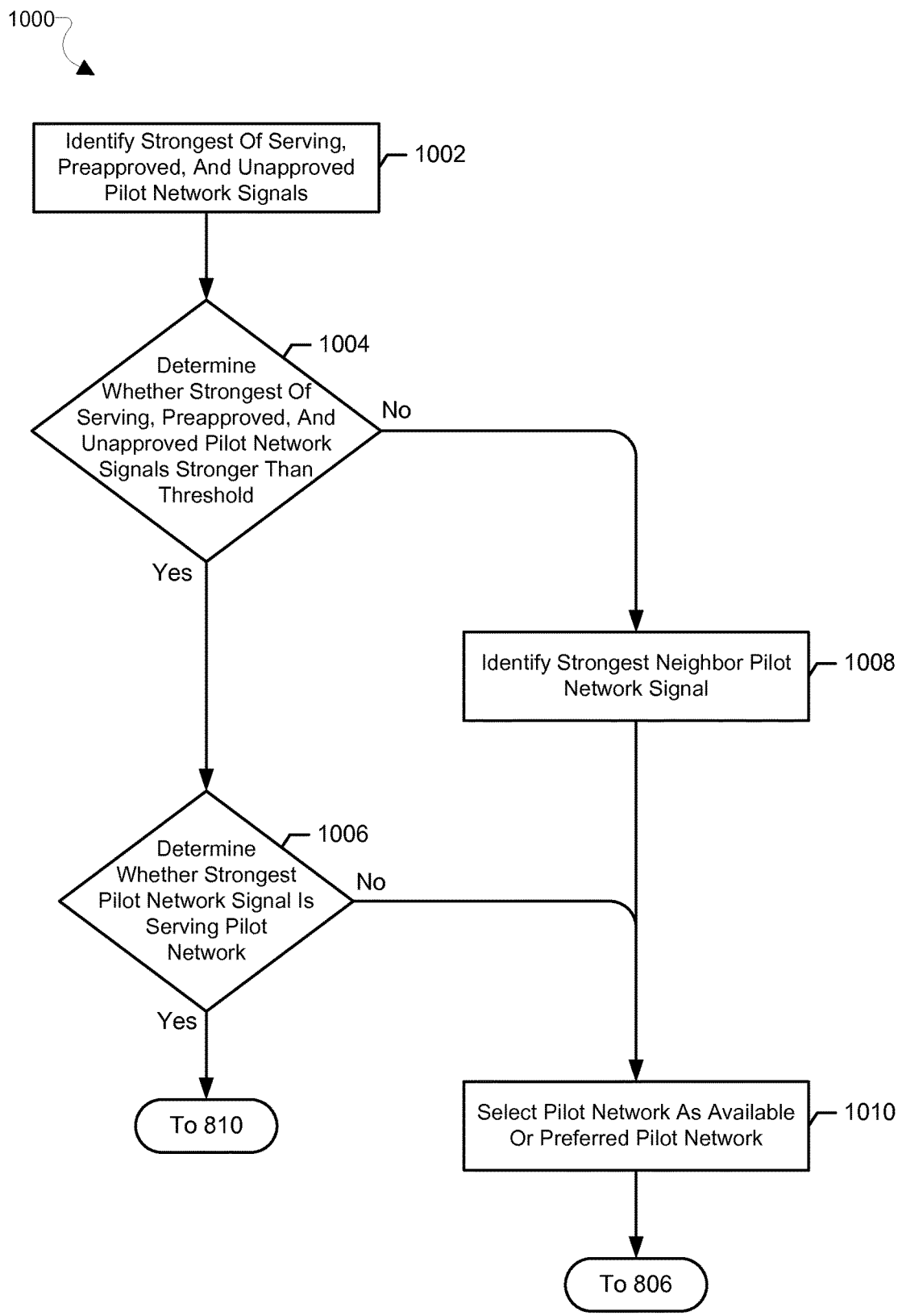
FIG. 10 is a process flow diagram illustrating a method for searching for an available or preferred pilot network for responding to a general page message of a mobile-terminated call while operating in a single radio LTE mode according to various embodiments.

In determination block 806, the wireless communication device may determine whether a preferred pilot network is found (e.g., methods 900 and 1000 in FIGS. 9 and 10, respectively).

In response to determining that a preferred pilot network is not found (i.e., determination block 806="No"), the wireless communication device may send a response to the general page message of the mobile-terminated call on the available pilot network in block 812.

In response to determining that a preferred pilot network is found (i.e., determination block 806="Yes"), the wireless communication device may send a response to the general page message of the mobile-terminated call on the preferred pilot network in block 810.

In some embodiments, rather than sending a response on the preferred pilot network in block 810 in response to determining that a preferred pilot network is found (i.e., determination block 806="Yes"), the wireless communication device may determine whether a preferred pilot network signal is stronger than a threshold in determination block 808. In some embodiments, the threshold may be a predetermined value or value derived from environmental, network, and/or wireless communication device conditions. In some embodiments, the threshold may be an available pilot network signal strength.

In response to determining that the preferred pilot network signal strength is stronger than the threshold (i.e., determination block 808="Yes"), the wireless communication device may send a response to the general page message of the mobile-terminated call on the preferred pilot network in block 810.

In response to determining that the preferred pilot network signal strength is not stronger than the threshold (i.e., determination block 808="No"), the wireless communication device may send a response to the general page message of the mobile-terminated call on the available pilot network in block 812.

In various embodiments, an available pilot network may be the most preferred pilot network, such as the serving pilot network. In such embodiments, the wireless communication device may not determine whether a preferred pilot network is found as in determination block 806, and instead, the wireless communication device may send a response to the general page message of the mobile-terminated call on the preferred pilot network in block 810.

FIG. 9 illustrates a method 900 for searching for an available or preferred pilot network for responding to a general page message of a mobile-terminated call while operating in a single radio LTE mode according to various embodiments. With reference to FIGS. 1-9, the method 900 may be executed in a wireless communication device, such as a wireless communication device (e.g., 110, 120, 200, 300) using software, general purpose or dedicated hardware, or a combination of software and hardware, such as a general purpose processor (e.g., 206), a baseband processor (e.g., 216) or the like.

In block 902, the wireless communication device may determine whether a serving pilot network signal is stronger than a first threshold. In various embodiments, the first threshold may be a predetermined value or value derived from environmental, network, and/or wireless communication device conditions. In some embodiments, the first threshold may be a strongest preapproved pilot network signal strength. In some embodiments, the first threshold may be a strongest unapproved pilot network signal strength, such as when no preapproved pilot network signal can be found, or when the strongest unapproved pilot network signal strength is stronger than the strongest preapproved pilot network signal strength. In some embodiments, the first threshold may be a nominal signal strength for the wireless communication device to be able to send a response to the general page message for the mobile-terminated call on the serving pilot network.

In response to determining that the serving pilot network signal strength is stronger than the first threshold (i.e., determination block 902="Yes"), the wireless communication device may send a response to the general page message of the mobile-terminated call on the preferred pilot network in block 810.

In response to determining that the serving pilot network signal strength is not stronger than the first threshold (i.e., determination block 902="No"), the wireless communication device may determine whether a preapproved pilot network signal is stronger than a second threshold in determination block 904. In various embodiments, the second threshold may be a predetermined value or value derived from environmental, network, and/or wireless communication device conditions. In some embodiments, the second threshold may be the serving pilot network signal strength; for example, when the serving pilot signal strength is determined to be too weak to send a response to the general page message of the mobile-terminated call. In some embodiments, the second threshold may be a strongest unapproved pilot network signal strength. In some embodiments, the second threshold may be a nominal signal strength for the wireless communication device to be able to send a response to the general page message for the mobile-terminated call on the preapproved pilot network.

In response to determining that the serving preapproved network signal strength is stronger than the second threshold (i.e., determination block 904="Yes"), the wireless communication device may select the preapproved pilot network as the available pilot network or the preferred pilot network in block 910. In some embodiments, the wireless communication device may select the preapproved pilot network as the available pilot network when no other pilot network is previously selected for sending a response to the general page message for the mobile-terminated call. In some embodiments, the wireless communication device may select the preapproved pilot network as the preferred pilot network when the available pilot network or another preferred pilot network is previously selected. The preapproved pilot network may be selected as the preferred pilot network by favorable comparison of the rank of the preapproved pilot network to the ranking of the available pilot network or the other preferred pilot network. Next, in determination block 806 (FIG. 8), the wireless communication device may determine whether a preferred pilot network is found.

In response to determining that the preapproved pilot network signal strength is not stronger than the second threshold (i.e., determination block 904="No"), the wireless communication device may determine whether an unapproved pilot network signal is stronger than a third threshold in determination block 906. In various embodiments, the third threshold may be a predetermined value or value derived from environmental, network, and/or wireless communication device conditions. In some embodiments, the third threshold may be the serving pilot network signal strength or the strongest preapproved pilot network signal strength; for example, when the serving pilot signal strength and the strongest preapproved pilot network signal strength are determined to be too weak to send a response to the general page message of the mobile-terminated call. In some embodiments, the third threshold may be a nominal signal strength for the wireless communication device to be able to send a response to the general page message for the mobile-terminated call on the unapproved pilot network.

In response to determining that the unapproved pilot network signal strength is stronger than the third threshold (i.e., determination block 906="Yes"), the wireless communication device may select the unapproved pilot network as the available pilot network or the preferred pilot network in block 910, and then determine whether a preferred pilot network is found in determination block 806 (FIG. 8). In some embodiments, the wireless communication device may select the unapproved pilot network as the available pilot network when no other pilot network is previously selected for sending a response to the general page message for the mobile-terminated call. In some embodiments, the wireless communication device may select the unapproved pilot network as the preferred pilot network when the available pilot network or another preferred pilot network is previously selected. The unapproved pilot network may be selected as the preferred pilot network by favorable comparison of the rank of the unapproved pilot network to the ranking of the available pilot network or the other preferred pilot network In response to determining that the unapproved pilot network signal strength is not stronger than the third threshold (i.e., determination block 906="No"), the wireless communication device may identify the strongest neighbor pilot network signal in block 908, set the strongest neighbor pilot network as the available pilot network in block 910, and proceed with the method 800 in determination block 806 (FIG. 8).

FIG. 10 illustrates a method 1000 for searching for an available or preferred pilot network for responding to a general page message of a mobile-terminated call while operating in a single radio LTE mode according to various embodiments. With reference to FIGS. 1-10, the method 1000 may be executed in a wireless communication device (e.g., 110, 120, 200, 300) using software, general purpose or dedicated hardware, or a combination of software and hardware, such as a general purpose processor (e.g., 206), a baseband processor (e.g., 216) or the like.

In block 1002, the wireless communication device may identify a strongest of the serving pilot network signal, the preapproved pilot network signal, and the unapproved pilot network signal.

In determination block 1004, the wireless communication device may determine whether the strongest of the serving pilot network signal, the preapproved pilot network signal, and the unapproved pilot network signal is stronger than a threshold. In various embodiments, the threshold may be a predetermined value or value derived from environmental, network, and/or wireless communication device conditions. In some embodiments, the threshold may be a strongest neighbor pilot network signal strength. In some embodiments, the threshold may be a nominal signal strength for the wireless communication device to be able to send a response to the general page message for the mobile-terminated call on the strongest of the serving pilot network signal, the preapproved pilot network signal, and the unapproved pilot network signal.

In response to determining that the strongest of the serving pilot network signal, the preapproved pilot network signal, and the unapproved pilot network signal is not stronger than the threshold (i.e., determination block 1004="No"), the wireless communication device may identify the strongest neighbor pilot network signal in block 1008, select the strongest neighbor pilot network as the available pilot network in block 1010, and proceed with the method 800 in determination block 806 (FIG. 8). In response to determining that the strongest of the serving pilot network signal, the preapproved pilot network signal, and the unapproved pilot network signal is stronger than the threshold (i.e., determination block 1004="Yes"), the wireless communication device may determine whether the strongest of the serving pilot network signal, the preapproved pilot network signal, and the unapproved pilot network signal is the serving pilot network signal in determination block 1006.

In response to determining that the strongest of the serving pilot network signal, the preapproved pilot network signal, and the unapproved pilot network signal is the serving pilot network signal (i.e., determination block 1006="Yes"), the wireless communication device may proceed with the method 800 to send a response to the general page message of the mobile-terminated call on the preferred pilot network in block 810 (FIG. 8).

In response to determining that the strongest of the serving pilot network signal, the preapproved pilot network signal, and the unapproved pilot network signal is not the serving pilot network signal (i.e., determination block 1006="No"), the wireless communication device may select the strongest of the preapproved pilot network and the unapproved pilot network as the available pilot network in block 1010, and proceed with the method 800 in determination block 806 (FIG. 8).

Figure 11:
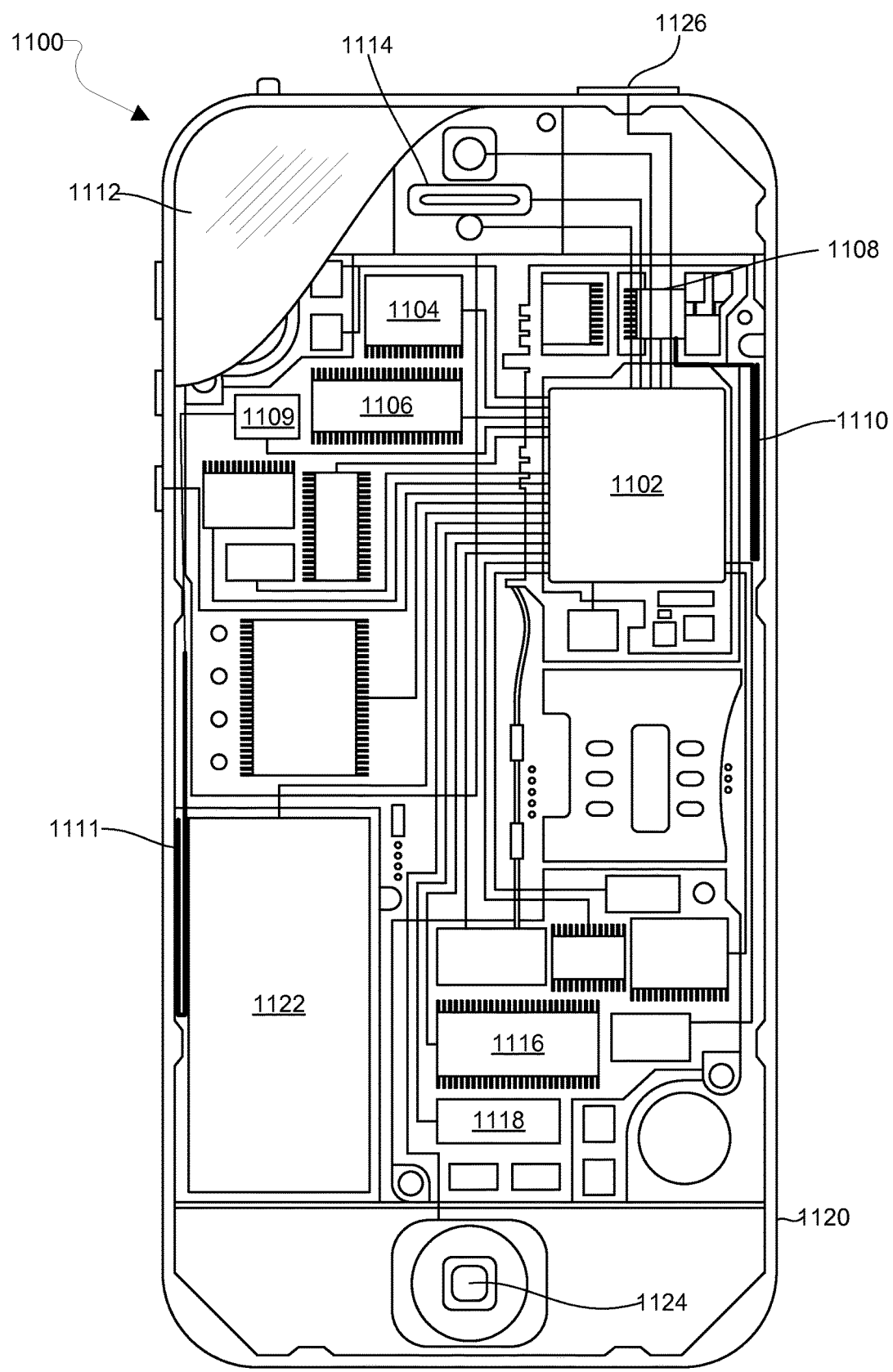
FIG. 11 is a component diagram of an example multi-subscription communication device suitable for use with various embodiments.

FIG. 11 illustrates an exemplary multi-subscription wireless communication device 1100 suitable for use with the various embodiments. The multi-subscription wireless communication device 1100 may be similar to the multi-technology wireless communication device 110, 120, 200, or 300. With reference to FIGS. 1-11, the multi-subscription wireless communication device 1100 may include a processor 1102 coupled to a touchscreen controller 1104 and an internal memory 1106. The processor 1102 may be one or more multicore integrated circuits designated for general or specific processing tasks. The internal memory 1106 may be volatile or non-volatile memory, and may be secure and/or encrypted memory, or unsecure and/or unencrypted memory, or any combination thereof. The touchscreen controller 1104 and the processor 1102 may also be coupled to a touchscreen panel 1112, such as a resistive-sensing touchscreen, capacitive-sensing touchscreen, infrared sensing touchscreen, etc. Additionally, the display of the multi-subscription wireless communication device 1100 need not have touch screen capability.

The multi-subscription wireless communication device 1100 may have two or more cellular network transceivers 1108, 1109 coupled to antennae 1110, 1111, for sending and receiving communications via a cellular communication network. The combination of the transceiver 1108 or 1109 and its associated antenna 1110 or 1111, and associated components, is referred to herein as a radio frequency (RF) chain. The cellular network transceivers 1108, 1109 may be coupled to the processor 1102, which is configured with processor-executable instructions to perform operations of the embodiment methods described above. The cellular network transceivers 1108, 1109 and antennae 1110, 1111 may be used with the above-mentioned circuitry to implement the various wireless transmission protocol stacks and interfaces. The multi-subscription wireless communication device 1100 may include one or more cellular network wireless modem chips 1116 coupled to the processor and the cellular network transceivers 1108, 1109 and configured to enable communication via cellular communication networks.

The multi-subscription wireless communication device 1100 may include a peripheral device connection interface 1118 coupled to the processor 1102. The peripheral device connection interface 1118 may be singularly configured to accept one type of connection, or may be configured to accept various types of physical and communication connections, common or proprietary, such as USB, FireWire, Thunderbolt, or PCIe. The peripheral device connection interface 1118 may also be coupled to a similarly configured peripheral device connection port (not shown).

The multi-subscription wireless communication device 1100 may also include speakers 1114 for providing audio outputs. The multi-subscription wireless communication device 1100 may also include a housing 1120, constructed of a plastic, metal, or a combination of materials, for containing all or some of the components discussed herein. The multi-subscription wireless communication device 1100 may include a power source 1122 coupled to the processor 1102, such as a disposable or rechargeable battery. The rechargeable battery may also be coupled to the peripheral device connection port to receive a charging current from a source external to the multi-subscription wireless communication device 1100. The multi-subscription wireless communication device 1100 may also include a physical button 1124 for receiving user inputs. The multi-subscription wireless communication device 1100 may also include a power button 1126 for turning the multi-subscription wireless communication device 1100 on and off.

Computer program code or "program code" for execution on a programmable processor for carrying out operations of the various aspects may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

Many wireless communication devices operating system kernels are organized into a user space (where non-privileged code runs) and a kernel space (where privileged code runs). This separation is of particular importance in Android and other general public license (GPL) environments in which code that is part of the kernel space must be GPL licensed, while code running in the user-space may not be GPL licensed. It should be understood that the various software components/modules discussed here may be implemented in either the kernel space or the user space, unless expressly stated otherwise.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the various embodiments may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of wireless communication devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of responding to a page message for a mobile-terminated call by a wireless communication device using a single radio Long-Term Evolution (LTE) mode, comprising:
   receiving the page message for the mobile-terminated call;
   releasing resources of the wireless communication device owned by a non-LTE voice radio access technology receiving the page message;
   executing an extended service request by an LTE radio access technology;
   searching for a network for responding to the page message after the extended service request is completed, wherein the network is from a set of networks including a serving pilot network, a preapproved pilot network, and an unapproved pilot network, and wherein each of the serving pilot network, the preapproved pilot network, and the unapproved pilot network belong to a first base station;
   sending a page message response using the network in response to finding the network; and
   in response to not finding a network:
      identifying a strongest neighbor pilot network; and
      sending a page message response using the strongest neighbor pilot network.

2. The method of claim 1,
   wherein searching for a network for responding to the page message after the extended service request is completed comprises:

determining whether a serving pilot network signal of the serving pilot network exceeds a first threshold;

determining whether a preapproved pilot network signal of the preapproved pilot network exceeds a second threshold in response to determining that the serving pilot network signal does not exceed the first threshold; and determining whether an unapproved pilot network signal of the unapproved pilot network exceeds a third threshold in response to determining that the preapproved pilot network signal does not exceed the second threshold; and wherein sending a page message response using the network comprises:

sending the page message response using the serving pilot network in response to the serving pilot network signal exceeding the first threshold;

sending the page message response using the preapproved pilot network in response to the preapproved pilot network signal exceeding the second threshold; and sending the page message response using the unapproved pilot network in response to the unapproved pilot network signal exceeding the third threshold.

3. The method of claim 1, wherein searching for a network for responding to the page message after the extended service request is completed comprises identifying a strongest pilot network signal corresponding to the network from a set of pilot network signals including a serving pilot network signal of the serving pilot network, a preapproved pilot network signal of the preapproved pilot network, and an unapproved pilot network signal of the unapproved pilot network; and wherein sending a page message response using the network comprises sending the page message response using the network corresponding to the strongest pilot network signal.

4. The method of claim 1, further comprising:

searching for a preferred network for responding to the page message after the extended service request is completed while searching for the network for responding to the page message and while identifying the strongest neighbor pilot network;

wherein sending a page message response using the network comprises sending the page message response using the preferred network instead of the network in response to finding the preferred network; and wherein sending a page message response using the strongest neighbor pilot network comprises sending the page message response using the preferred network instead of the strongest neighbor pilot network in response to finding the preferred network.

5. The method of claim 4, further comprising:

selecting one of the serving pilot network, the preapproved pilot network, the unapproved pilot network, and the strongest neighbor pilot network as the network, wherein if the preapproved pilot network is selected as the network then the preferred network is the serving pilot network, wherein if the unapproved pilot network is selected as the network then the preferred network is selected from a group including the serving pilot network and the preapproved pilot network, and wherein if the strongest neighbor pilot network is selected as the network then the preferred network is selected from a group including the serving pilot network, the preapproved pilot network, and the unapproved pilot network; and determining whether a preferred network signal exceeds a threshold, wherein sending the page message response using the preferred network instead of the network comprises sending the page message response using the preferred network in response to the preferred network signal exceeding the threshold; and wherein sending the page message response using the preferred network instead of the strongest neighbor pilot network comprises sending the page message response using the preferred network in response to the preferred network signal exceeding the threshold.

6. The method of claim 1, wherein receiving the page message for the mobile-terminated call comprises receiving the page message for the mobile-terminated call in the serving pilot network;

the method further comprising:

receiving a first message specifying the preapproved pilot network;

receiving a second message containing configuration information for the unapproved pilot network; and storing the preapproved pilot network and the unapproved pilot network.

7. The method of claim 6, further comprising ranking the serving pilot network higher than the preapproved pilot network, and the preapproved pilot network higher than the unapproved pilot network.

8. The method of claim 1, wherein the serving pilot network has a first base station identifier;

wherein the preapproved pilot network has a second base station identifier;

wherein the unapproved pilot network has a third base station identifier;

wherein the strongest neighbor pilot network has a fourth base station identifier;

wherein the first base station identifier, the second base station identifier, and the third base station identifier identify the first base station; and wherein the fourth base station identifier identifies a second base station.

9. A wireless communication device configured to respond to a page message for a mobile-terminated call by using a single radio Long-Term Evolution (LTE) mode, comprising:

a radio frequency (RF) chain configured to transmit and receive wireless communication signals;

a processor communicatively connected to the RF chain and configured with processor-executable instructions to:

receive the page message for the mobile-terminated call;

release resources of the wireless communication device owned by a non-LTE voice radio access technology receiving the page message;

execute an extended service request by an LTE radio access technology;

search for a network for responding to the page message after the extended service request is completed, wherein the network is from a set of networks including a serving pilot network, a preapproved pilot network, and an unapproved pilot network, and wherein each of the serving pilot network, the preapproved pilot network, and the unapproved pilot network belong to a first base station;

send a page message response using the network in response to finding the network; and in response to not finding a network:
identify a strongest neighbor pilot network; and
send a page message response using the strongest neighbor pilot network.

10. The wireless communication device of claim 9, wherein the processor is further configured with processor-executable instructions to:

search for a network for responding to the page message after the extended service request is completed by:
determining whether a serving pilot network signal of the serving pilot network exceeds a first threshold;
determining whether a preapproved pilot network signal of the preapproved pilot network exceeds a second threshold in response to determining that the serving pilot network signal does not exceed the first threshold; and
determining whether an unapproved pilot network signal of the unapproved pilot network exceeds a third threshold in response to determining that the preapproved pilot network signal does not exceed the second threshold; and send a page message response using the network by:
sending the page message response using the serving pilot network in response to the serving pilot network signal exceeding the first threshold;
sending the page message response using the preapproved pilot network in response to the preapproved pilot network signal exceeding the second threshold; and
sending the page message response using the unapproved pilot network in response to the unapproved pilot network signal exceeding the third threshold.

11. The wireless communication device of claim 9, wherein the processor is further configured with processor-executable instructions to search for a network for responding to the page message after the extended service request is completed by:

identifying a strongest pilot network signal corresponding to the network from a set of pilot network signals including a serving pilot network signal of the serving pilot network, a preapproved pilot network signal of the preapproved pilot network, and an unapproved pilot network signal of the unapproved pilot network, wherein the processor is further configured with processor-executable instructions to send a page message response using the network by sending the page message response using the network corresponding to the strongest pilot network signal.

12. The wireless communication device of claim 9, wherein the processor is further configured with processor-executable instructions to:

search for a preferred network for responding to the page message after the extended service request is completed while searching for the network for responding to the page message and while identifying the strongest neighbor pilot network, wherein the processor is further configured with processor-executable instructions to send a page message response using the network by sending the page message response using the preferred network instead of the network in response to finding the preferred network, and wherein the processor is further configured with processor-executable instructions to send a page message response using the strongest neighbor pilot network by sending the page message response using the preferred network instead of the strongest neighbor pilot network in response to finding the preferred network.

13. The wireless communication device of claim 12, wherein the processor is further configured with processor-executable instructions to:

select one of the serving pilot network, the preapproved pilot network, the unapproved pilot network, and the strongest neighbor pilot network as the network,
wherein if the preapproved pilot network is selected as the network then the preferred network is the serving pilot network,
wherein if the unapproved pilot network is selected as the network then the preferred network is selected from a group including the serving pilot network and the preapproved pilot network, and
wherein if the strongest neighbor pilot network is selected as the network then the preferred network is selected from a group including the serving pilot network, the preapproved pilot network, and the unapproved pilot network; and determine whether a preferred network signal exceeds a threshold, wherein the processor is further configured with processor-executable instructions to send the page message response using the preferred network instead of the network comprises sending the page message response using the preferred network in response to the preferred network signal exceeding the threshold; and wherein the processor is further configured with processor-executable instructions to send the page message response using the preferred network instead of the strongest neighbor pilot network comprises sending the page message response using the preferred network in response to the preferred network signal exceeding the threshold.

14. The wireless communication device of claim 9, wherein the processor is further configured with processor-executable instructions to receive the page message for the mobile-terminated call by receiving the page message for the mobile-terminated call in the serving pilot network, wherein the processor is further configured with processor-executable instructions to:
receive a first message specifying the preapproved pilot network;
receive a second message containing configuration information for the unapproved pilot network; and
store the preapproved pilot network and the unapproved pilot network.

15. The wireless communication device of claim 14, wherein the processor is further configured with processor-executable instructions to rank the serving pilot network higher than the preapproved pilot network, and the preapproved pilot network higher than the unapproved pilot network.

16. The wireless communication device of claim 9, wherein:
the serving pilot network has a first base station identifier;
the preapproved pilot network has a second base station identifier;
the unapproved pilot network has a third base station identifier;
the strongest neighbor pilot network has a fourth base station identifier;

the first base station identifier, the second base station identifier, and the third base station identifier identify the first base station; and the fourth base station identifier identifies a second base station.

17. A wireless communication device configured to respond to a page message for a mobile-terminated call by using a single radio Long-Term Evolution (LTE) mode, comprising:
 means for receiving the page message for the mobile-terminated call;
 means for releasing resources of the wireless communication device owned by a non-LTE voice radio access technology receiving the page message;
 means for executing an extended service request by an LTE radio access technology;
 means for searching for a network for responding to the page message after the extended service request is completed, wherein the network is from a set of networks including a serving pilot network, a preapproved pilot network, and an unapproved pilot network, and wherein each of the serving pilot network, the preapproved pilot network, and the unapproved pilot network belong to a first base station;
 means for sending a page message response using the network in response to finding the network;
 means for identifying a strongest neighbor pilot network in response to not finding a network; and
 means for sending a page message response using the strongest neighbor pilot network in response to not finding a network.

18. A non-transitory processor-readable medium having stored thereon processor-executable software instructions to cause a processor of a wireless communication device to perform operations comprising:
 receiving a page message for a mobile-terminated call;
 releasing resources of the wireless communication device owned by a non-LTE voice radio access technology receiving the page message;
 executing an extended service request by an LTE radio access technology;
 searching for a network for responding to the page message after the extended service request is completed, wherein the network is from a set of networks including a serving pilot network, a preapproved pilot network, and an unapproved pilot network, and wherein each of the serving pilot network, the preapproved pilot network, and the unapproved pilot network belong to a first base station;
 sending a page message response using the network in response to finding the network; and
 in response to not finding a network:
  identifying a strongest neighbor pilot network; and
  sending a page message response using the strongest neighbor pilot network.

19. The non-transitory processor-readable medium of claim 18, wherein the stored processor-executable software instructions are configured to cause the processor of the wireless communication device to perform operations such that:
 searching for a network for responding to the page message after the extended service request is completed comprises:
  determining whether a serving pilot network signal of the serving pilot network exceeds a first threshold;
  determining whether a preapproved pilot network signal of the preapproved pilot network exceeds a second threshold in response to determining that the serving pilot network signal does not exceed the first threshold; and
  determining whether an unapproved pilot network signal of the unapproved pilot network exceeds a third threshold in response to determining that the preapproved pilot network signal does not exceed the second threshold; and
 sending a page message response using the network comprises:
  sending the page message response using the serving pilot network in response to the serving pilot network signal exceeding the first threshold;
  sending the page message response using the preapproved pilot network in response to the preapproved pilot network signal exceeding the second threshold; and
  sending the page message response using the unapproved pilot network in response to the unapproved pilot network signal exceeding the third threshold.

20. The non-transitory processor-readable medium of claim 18, wherein the stored processor-executable software instructions are configured to cause the processor of the wireless communication device to perform operations such that searching for a network for responding to the page message after the extended service request is completed comprises:
 identifying a strongest pilot network signal corresponding to the network from a set of pilot network signals including a serving pilot network signal of the serving pilot network, a preapproved pilot network signal of the preapproved pilot network, and an unapproved pilot network signal of the unapproved pilot network,
 wherein sending a page message response using the network comprises sending the page message response using the network corresponding to the strongest pilot network signal.

21. The non-transitory processor-readable medium of claim 18, wherein the stored processor-executable software instructions are configured to cause the processor of the wireless communication device to perform operations further comprising:
 searching for a preferred network for responding to the page message after the extended service request is completed while searching for the network for responding to the page message and while identifying the strongest neighbor pilot network,
 wherein sending a page message response using the network comprises sending the page message response using the preferred network instead of the network in response to finding the preferred network, and
 wherein sending a page message response using the strongest neighbor pilot network comprises sending the page message response using the preferred network instead of the strongest neighbor pilot network in response to finding the preferred network.

22. The non-transitory processor-readable medium of claim 21, wherein the stored processor-executable software instructions are configured to cause the processor of the wireless communication device to perform operations further comprising:
 selecting one of the serving pilot network, the preapproved pilot network, the unapproved pilot network, and the strongest neighbor pilot network as the network, wherein the preapproved pilot network is selected as the network the preferred network is the serving pilot network, wherein the unapproved pilot network is selected as the network the preferred network is selected from a group including the serving pilot network and the preapproved pilot network, and wherein the strongest neighbor pilot network is selected as the network the preferred network is selected from a group including the serving pilot network, the preapproved pilot network, and the unapproved pilot network; and determining whether a preferred network signal exceeds a threshold, wherein sending the page message response using the preferred network instead of the network comprises sending the page message response using the preferred network in response to the preferred network signal exceeding the threshold; and wherein sending the page message response using the preferred network instead of the strongest neighbor pilot network comprises sending the page message response using the preferred network in response to the preferred network signal exceeding the threshold.

23. The non-transitory processor-readable medium of claim 18, wherein the stored processor-executable software instructions are configured to cause the processor of the wireless communication device to perform operations such that receiving the page message for the mobile-terminated call comprises receiving the page message for the mobile-terminated call in the serving pilot network, and wherein the stored processor-executable software instructions are configured to cause the processor of the wireless communication device to perform operations further comprising:

receiving a first message specifying the preapproved pilot network;

receiving a second message containing configuration information for the unapproved pilot network; and storing the preapproved pilot network and the unapproved pilot network.

24. The non-transitory processor-readable medium of claim 23, the stored processor-executable software instructions are configured to cause the processor of the wireless communication device to perform operations further comprising ranking the serving pilot network higher than the preapproved pilot network, and the preapproved pilot network higher than the unapproved pilot network.

25. The non-transitory processor-readable medium of claim 18, wherein the serving pilot network has a first base station identifier;

wherein the preapproved pilot network has a second base station identifier;

wherein the unapproved pilot network has a third base station identifier;

wherein the strongest neighbor pilot network has a fourth base station identifier;

wherein the first base station identifier, the second base station identifier, and the third base station identifier identify the first base station; and wherein the fourth base station identifier identifies a second base station.

* * * * *